United States Patent
Xu et al.

(10) Patent No.: US 12,532,018 B2
(45) Date of Patent: Jan. 20, 2026

(54) VIDEO DECODER, VIDEO ENCODER, AND BITSTREAM PERFORMING PARITY HIDING

(71) Applicant: GUANGDONG OPPO MOBILE TELECOMMUNICATIONS CORP., LTD., Guangdong (CN)

(72) Inventors: Luhang Xu, Guangdong (CN); Hang Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/900,719

(22) Filed: Sep. 28, 2024

(65) Prior Publication Data

US 2025/0030883 A1  Jan. 23, 2025

Related U.S. Application Data

(63) Continuation of application No. PCT/CN2022/101259, filed on Jun. 24, 2022.

(51) Int. Cl.
*H04N 7/12* (2006.01)
*H04N 19/119* (2014.01)
*H04N 19/176* (2014.01)
*H04N 19/467* (2014.01)

(52) U.S. Cl.
CPC ......... *H04N 19/467* (2014.11); *H04N 19/119* (2014.11); *H04N 19/176* (2014.11)

(58) Field of Classification Search
CPC .................................................. H04N 19/467
See application file for complete search history.

(56) References Cited

U.S. PATENT DOCUMENTS

| | | | |
|---|---|---|---|
| 2013/0272424 | A1 | 10/2013 | Sole Rojals et al. |
| 2014/0133574 | A1 | 5/2014 | Lee et al. |
| 2021/0218966 | A1 | 7/2021 | Lai et al. |

FOREIGN PATENT DOCUMENTS

| | | |
|---|---|---|
| CN | 104380740 | 2/2015 |
| CN | 108055541 | 5/2018 |
| CN | 108235023 | 6/2018 |
| CN | 111837389 | 10/2020 |
| CN | 112422991 | 2/2021 |
| CN | 112514386 | 3/2021 |

(Continued)

OTHER PUBLICATIONS

WIPO, International Search Report and Written Opinion for International Application No. PCT/CN2022/084135, Jan. 4, 2023.

(Continued)

*Primary Examiner* — Y Lee
(74) *Attorney, Agent, or Firm* — Hodgson Russ LLP

(57) ABSTRACT

A video decoder, a video encoder, and a bitstream are provided. A bitstream is decoded, to obtain P quantized coefficients and a first quantized coefficient in a current region, where the current region is a region in a current block including at least one non-zero quantized coefficient, the first quantized coefficient is obtained by performing parity hiding on a second quantized coefficient in the current region, and P is a positive integer. Then, a parity of the second quantized coefficient is determined according to the P quantized coefficients. The second quantized coefficient having the parity is determined according to the first quantized coefficient and the parity of the second quantized coefficient.

20 Claims, 10 Drawing Sheets

(56) References Cited

FOREIGN PATENT DOCUMENTS

| CN | 112543324 | 3/2021 |
| EP | 2675159 | 12/2013 |
| WO | 2019135630 | 7/2019 |

OTHER PUBLICATIONS

WIPO, International Search Report and Written Opinion for International Application No. PCT/CN2022/101259, Dec. 21, 2022.

| 0 | 1 | 5 | 6 |
|---|---|---|---|
| 2 | 4 | 7 | 12 |
| 3 | 8 | 11 | 13 |
| 9 | 10 | 14 | 15 |

| 0 | 1 | 3 | 6 |
|---|---|---|---|
| 2 | 4 | 7 | 10 |
| 5 | 8 | 11 | 13 |
| 9 | 12 | 14 | 15 |

| 0 | 4 | 8 | 12 |
|---|---|---|---|
| 1 | 5 | 9 | 13 |
| 2 | 6 | 10 | 14 |
| 3 | 7 | 11 | 15 |

| 0 | 1 | 2 | 3 |
|---|---|---|---|
| 4 | 5 | 6 | 7 |
| 8 | 9 | 10 | 11 |
| 12 | 13 | 14 | 15 |

| 63 | 62 | 58 | 57 | 49 | 48 | 36 | 35 |
|---|---|---|---|---|---|---|---|
| 61 | 59 | 56 | 50 | 47 | 37 | 34 | 21 |
| 60 | 55 | 51 | 46 | 38 | 33 | 22 | 20 |
| 54 | 52 | 45 | 39 | 32 | 23 | 19 | 10 |
| 53 | 44 | 40 | 31 | 24 | 18 | 11 | 9 |
| 43 | 41 | 30 | 25 | 17 | 12 | 8 | 3 |
| 42 | 29 | 26 | 16 | 13 | 7 | 4 | 2 |
| 28 | 27 | 15 | 14 | 6 | 5 | 1 | 0 |

FIG. 6

| 0  | 1  | 5  | 6  | 14 | 15 | 27 | 28 |
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |
FIG. 8
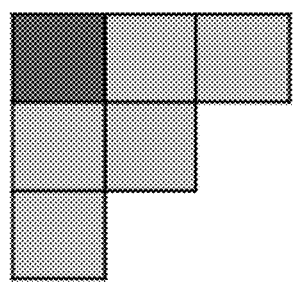
FIG. 9A
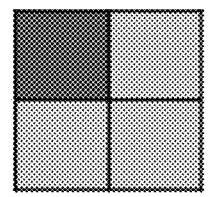
FIG. 9B

US 12,532,018 B2

VIDEO DECODER, VIDEO ENCODER, AND BITSTREAM PERFORMING PARITY HIDING

CROSS-REFERENCE TO RELATED APPLICATION (S)

This application is a continuation of International Application No. PCT/CN2022/101259, filed Jun. 24, 2022, which claims priority to International Application No. PCT/CN2022/084135, filed Mar. 30, 2022, the entire disclosures of which are incorporated by reference.

TECHNICAL FIELD

This disclosure relates to the field of video coding technology, in particular to a video decoder, a video encoder, and a bitstream.

BACKGROUND

Digital video technologies can be applied to a variety of video devices, such as digital televisions, smartphones, computers, e-readers, or video players. With the development of the video technology, video data includes a large amount of data. To facilitate the transmission of the video data, the video apparatus adopts the video compression technology to achieve more efficient transmission or storage of the video data.

In the process of video compression, to facilitate encoding, transform coefficients are quantized. The purpose of quantization is to scale the transform coefficients, to reduce the number of bits consumed in encoding coefficients. However, the current quantization method has a high encoding cost.

SUMMARY

In a first aspect, a video decoder is provided in the disclosure. The video decoder includes at least one processor and a memory. The memory is coupled to the at least one processor and stores at least one computer executable instruction thereon. When executed by the at least one processor, the at least one computer executable instruction causes the at least one processor to: decode a bitstream, to obtain P quantized coefficients and a first quantized coefficient in a current region, the current region being a region in a current block including at least one non-zero quantized coefficient, the first quantized coefficient being obtained by performing parity hiding on a second quantized coefficient in the current region, and P being a positive integer; determine a parity of the second quantized coefficient according to the P quantized coefficients; and determine the second quantized coefficient having the parity according to the first quantized coefficient and the parity of the second quantized coefficient.

In a second aspect, a video encoder is provided. The video encoder includes at least one processor and a memory. The memory is coupled to the at least one processor and stores at least one computer executable instruction thereon. When executed by the at least one processor, the at least one computer executable instruction causes the at least one processor to: partition a current block into N regions, N being a positive integer; determine a second quantized coefficient in a current region and hide a parity of the second quantized coefficient to obtain a first quantized coefficient, the current region being a region among the N regions including at least one non-zero quantized coefficient; and encode the first quantized coefficient to obtain a bitstream, the parity of the second quantized coefficient being indicated by P quantized coefficients in the current region and P being a positive integer.

In a third aspect, a bitstream is provided. The bitstream is obtained according to the following. A current block is partitioned into N regions, where N is a positive integer. A second quantized coefficient in a current region is determined, where the current region is a region among the N regions including at least one non-zero quantized coefficient. A parity of the second quantized coefficient is hidden to obtain a first quantized coefficient. The first quantized coefficient is encoded to obtain the bitstream, where the parity of the second quantized coefficient is indicated by P quantized coefficients in the current region and P is a positive integer.

BRIEF DESCRIPTION OF THE DRAWINGS

FIG. 6 is a schematic diagram of region partition according to embodiments of the disclosure.

FIG. 8 is a schematic diagram of region partition according to embodiments of the disclosure.

FIGS. 9A and 9B are schematic diagrams of decoded coefficients of a first quantized coefficient according to the disclosure.

DETAILED DESCRIPTION

Hereinafter, the technical solutions in embodiments of the disclosure will be described with reference to drawings in the embodiments of the disclosure.

The disclosure can be applied to the field of picture coding, video coding, hardware video coding, dedicated circuit video coding, real-time video coding, etc. Alternatively, the solution in the disclosure may be incorporated into other proprietary or industry standards, including ITU-TH.261, ISO/IECMPEG-1Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It should be understood that the technologies in the disclosure are not limited to any particular coding standard or technology.

Figure 1:
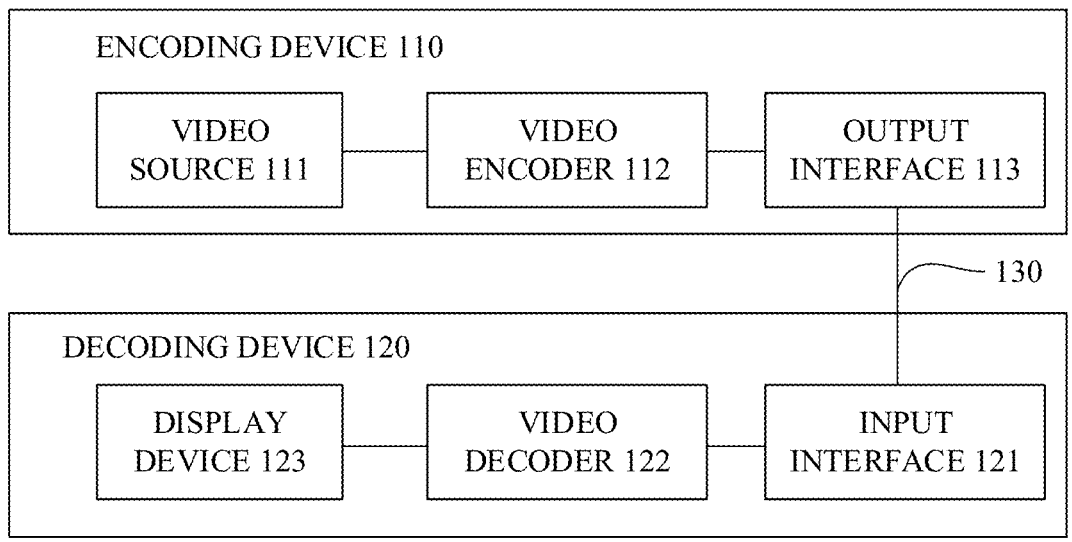
FIG. 1 is a schematic block diagram of a video coding system according to embodiments of the disclosure.

For ease of understanding, a video coding system in embodiments of the disclosure is firstly introduced with reference to FIG. 1.

FIG. 1 is a schematic block diagram of a video coding system 100 according to embodiments of the disclosure. It should be noted that FIG. 1 is only an example, and the video coding system in embodiments of the disclosure includes but is not limited to that illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the disclosure can be understood as a device having a video encoding function, and the decoding device 120 can be understood as a device having a video decoding function, that is, the encoding device 110 and the decoding device 120 in the embodiments of the disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In the example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, digital versatile discs (DVDs), flash memory, and the like. In the example, the decoding device 120 may obtain the encoded video data from the storage medium.

In another example, the channel 130 may include a storage server that may store video data encoded by the encoding device 110. In the example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the output interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated together with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the disclosure are not limited to FIG. 1. For example, the technology of the disclosure may also be applied to one-sided video encoding or one-sided video decoding.

In the following, a video encoder in embodiments of the disclosure will be introduced.

Figure 2:
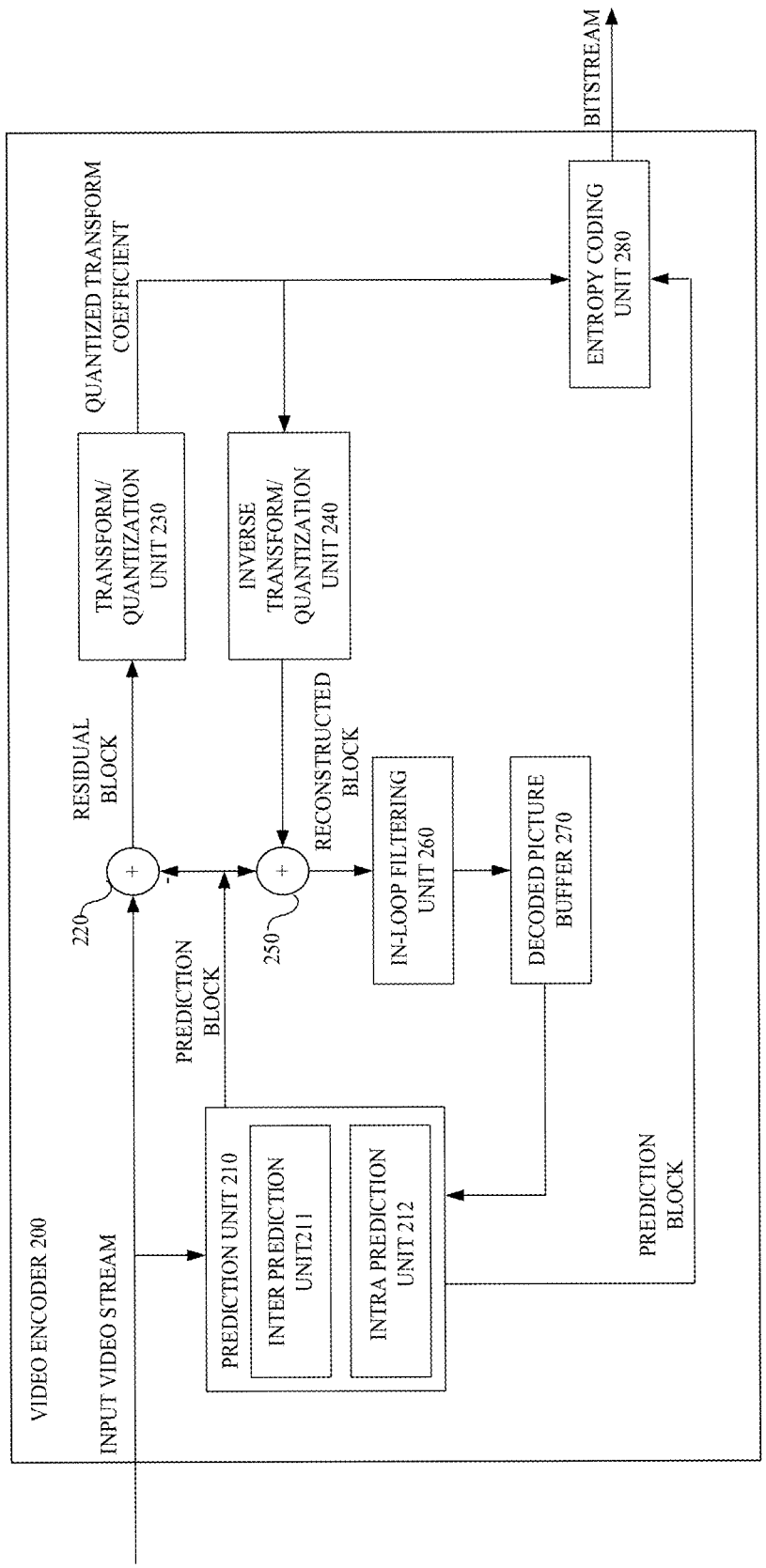
FIG. 2 is a schematic block diagram of a video encoder provided in embodiments of the disclosure.

FIG. 2 is a schematic block diagram of a video encoder 200 provided in embodiments of the disclosure. It should be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and V represent chrominance (Chroma) for describing colour and saturation. For example, in terms of color format, 4:2:0 represents that every 4 pixels have 4 luma components and 2 chroma components (YYYYCbCr), 4:2:2 represents that every 4 pixels have 4 luma components and 4 chroma component (YYYYCbCrCbCr), and 4:4:4 represents full pixel display (YYYYCbCrCbCrCbCrCbCr).

For example, the video encoder 200 reads video data, and for each picture in the video data, partitions the picture into several coding tree units (CTU). In some examples, the CTU may be called "tree block", "largest coding unit" (LCU), or "coding tree block" (CTB). Each CTU may be associated with a pixel block of the same size as the CTU within the picture. Each pixel may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further partitioned into several coding units (CUs) for coding. The CU may be a rectangular block or a square block. The CU may be further partitioned into a prediction unit (PU) and a transform unit (TU), so that coding, prediction, and transformation are separated, which is more conducive to flexibility in processing. In an example, the CTU is partitioned into CUs in a quadtree manner, and the CU is partitioned into TUs and PUs in a quadtree manner.

The video encoder and video decoder can support various PU sizes. Assuming that a size of a specific CU is 2N×2N, the video encoder and video decoder may support PUs of 2N×2N or N×N for intra prediction, and support symmetric PUs of 2N×2N, 2N×N, N×2N, N×N, or similar size for inter prediction; and the video encoder and video decoder may also support asymmetric PUs of 2N×nU, 2N×nD, nL×2N, or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, an in-loop filtering unit 260, a decoded picture buffer 270, and an entropy coding unit 280. It should be noted that the video encoder 200 may include more, fewer, or different functional components.

Optionally, in the disclosure, a current block may be referred to as a current CU or a current PU. A prediction block may be referred to as a prediction picture block or a picture prediction block. A reconstructed picture block may be referred to as a reconstructed block or a picture reconstructed block.

In some embodiments, the prediction unit 210 includes an inter prediction unit 211 and an intra prediction unit 212. Since there is a strong correlation between neighbouring samples in a video picture, intra prediction is used in the video coding technology to eliminate spatial redundancy between neighbouring samples. Since there is a strong similarity between neighbouring pictures in video, inter prediction is used in the video coding technology to eliminate temporal redundancy between neighbouring pictures, thereby improving encoding efficiency.

The inter prediction unit 211 may be used for inter prediction. In inter prediction, reference can be made to picture information of different pictures. In inter prediction, motion information is used to find a reference block from a reference picture, and a prediction block is generated according to the reference block to eliminate temporal redundancy. A frame for which inter prediction is used may be a P frame and/or a B frame, where P frame refers to a forward prediction frame, and B frame refers to bidirectional prediction frame. The motion information includes a reference picture list containing the reference picture, a reference picture index, and a motion vector. The motion vector can be an integer-sample motion vector or a fractional-sample motion vector. If the motion vector is the fractional-sample motion vector, interpolation filtering on the reference picture is required to generate a required fractional-sample block. Here, an integer-sample block or fractional-sample block found in the reference picture according to the motion vector is called a reference block. In some technologies, the reference block may be called a prediction block, and in some technologies, the prediction block will be generated based on the reference block. Generating the prediction block based on the reference block may also be understood as taking the reference block as a prediction block and then processing to generate a new prediction block based on the prediction block.

The intra prediction unit 212 predicts sample information of the current picture block only with reference to information of the same picture, to eliminate spatial redundancy. A frame used for intra prediction may be an I frame. For example, the white 4×4-sized block is the current block, and gray samples in the left row and the above column of the current block are the reference samples of the current block. In intra prediction, these reference samples are used to predict the current block. All these reference samples may be available, i.e., all these reference samples have been encoded or decoded. Some of these reference samples may not be available. For example, if the current block is at the leftmost side of the entire frame, the reference sample on the left of the current block is not available. Alternatively, in encoding and decoding the current block, if the lower left part of the current block has not been encoded or decoded, the reference sample at the lower left is not available. In the case where the reference sample is not available, the available reference sample or a certain value or a certain method may be used for padding, or no padding may be performed.

In some embodiments, the intra prediction method further includes a multiple reference line (MRL) intra prediction method, which may use more reference samples to improve encoding efficiency.

There are multiple prediction modes for intra prediction. In H.264, there are 9 modes for intra prediction of a 4×4-sized block. For mode 0, samples above the current block are copied in the vertical direction as prediction values of the current block. For mode 1, reference sample on the left of the current block are copied in the horizontal direction as prediction values of the current block. For mode 2 (DC), the average value of eight points A to D and I to L is taken as prediction values of all points. For modes 3 to 8, the reference sample(s) is copied to the corresponding position(s) in the current block at a certain angle, respectively. Because some positions in the current block cannot correspond exactly to reference samples, it may be necessary to use a weighted average of the reference samples, or a fractional-sample of the interpolated reference sample.

The intra prediction mode used in high efficiency video coding (HEVC) includes a planar mode, direct current (DC), and 33 angular modes, and there are 35 prediction modes in total. The intra prediction mode used in versatile video coding (VVC) includes planar, DC, and 65 angular modes, and there are 67 prediction modes in total. The intra modes used in AVS3 are DC, Plane, Bilinear, and 63 angular modes, with a total of 66 prediction modes.

It should be noted that with increase of the number of angular modes, intra prediction will be more accurate, which will be more in line with demand for development of high-definition and ultra-high-definition digital video.

The residual unit 220 may generate a residual block of the CU based on a sample block of the CU and a prediction block of a PU of the CU. For example, the residual unit 220 may generate the residual block of the CU such that each sample in the residual block has a value equal to a difference between a sample in the sample block of the CU and a corresponding sample in the prediction block of the PU of the CU.

The transform/quantization unit 230 may quantize a transform coefficient. The transform/quantization unit 230 may quantize a transform coefficient associated with a TU of a CU based on a quantization parameter (QP) value associated with the CU. The video encoder 200 may adjust the degree of quantization applied to a transform coefficient associated with the CU by adjusting the QP value associated with the CU.

The inverse transform/quantization unit 240 may perform inverse quantization and inverse transform respectively on the quantized transform coefficient, to reconstruct a residual block from the quantized transform coefficient.

The reconstruction unit 250 may add samples in the reconstructed residual block to corresponding samples in one or more prediction blocks generated by the prediction unit 210, to generate a reconstructed picture block associated with the TU. By reconstructing sample blocks of each TU of the CU in this way, the video encoder 200 can reconstruct the sample block of the CU.

The in-loop filtering unit 260 may perform deblocking filtering operations to reduce blocking artifacts of the sample block associated with the CU.

In some embodiments, the in-loop filtering unit 260 includes a deblocking filtering unit, a sample adaptive offset (SAO) unit, and an adaptive loop filtering (ALF) unit.

The decoded picture buffer 270 may store reconstructed sample blocks. The inter prediction unit 211 may use reference pictures including reconstructed sample blocks to perform inter prediction on PUs of other pictures. In addition, the intra prediction unit 212 may use the reconstructed sample blocks in the decoded picture buffer 270 to perform intra prediction on other PUs in the same picture as the CU.

The entropy coding unit 280 may receive the quantized transform coefficient from the transform/quantization unit 230. The entropy coding unit 280 may perform one or more entropy coding operations on the quantized transform coefficient to generate entropy coded data.

A basic process of video encoding is as follows. At an encoding end, a picture is partitioned into blocks, and for a current block, the prediction unit 210 performs intra prediction or inter prediction to generate a prediction block of the current block. The residual unit 220 may calculate a residual block based on the prediction block and an original block of the current block, that is, a difference between the prediction block and the original block of the current block, where the residual block may also be referred to as residual information. The residual block can be transformed and quantized by the transform/quantization unit 230 to remove information that is not sensitive to human eyes, to eliminate visual redundancy. Optionally, the residual block before being transformed and quantized by the transform/quantization unit 230 may be called a time-domain residual block, and the time-domain residual block after being transformed and quantized by the transform/quantization unit 230 may be called a frequency residual block or a frequency-domain residual block. The entropy coding unit 280 receives the quantized transform coefficient output by the transform/quantization unit 230, and may perform entropy coding on the quantized transform coefficient to output a bitstream. For example, the entropy coding unit 280 can eliminate character redundancy according to a target context model and probability information of a binary bitstream.

Further, the video encoder performs inverse quantization and inverse transformation on the quantized transform coefficients output from the transform/quantization unit 230, to obtain a residual block of the current block. Then, the video encoder adds the residual block of the current block to the prediction block of the current block, to obtain a reconstructed block of the current block. With the progress of encoding, the reconstructed blocks corresponding to other picture blocks in the current picture can be obtained, and these reconstructed blocks are spliced to obtain the reconstructed picture of the current picture. Since the error is introduced in the encoding process, to reduce the error, the reconstructed picture is filtered. For example, the reconstructed picture is filtered using ALF to reduce the difference between sample values of samples in the reconstructed picture and original sample values of samples in the current picture. The filtered reconstructed picture is stored in the decoded picture buffer 270, which can be used as a reference picture for inter prediction for subsequent pictures.

It should be noted that block partition information as well as mode information or parameter information for prediction, transformation, quantization, entropy coding, and in-loop filtering, etc. determined at the encoding end is carried in the bitstream when necessary. At the decoding end, the bitstream parsed and existing information is analyzed to determine the block partition information as well as the mode information or the parameter information for prediction, transformation, quantization, entropy coding, in-loop filtering, etc. that is the same as such information at the encoding end, to ensure the decoded picture obtained at the encoding end is the same as the decoded picture obtained at the decoding end.

Figure 3:
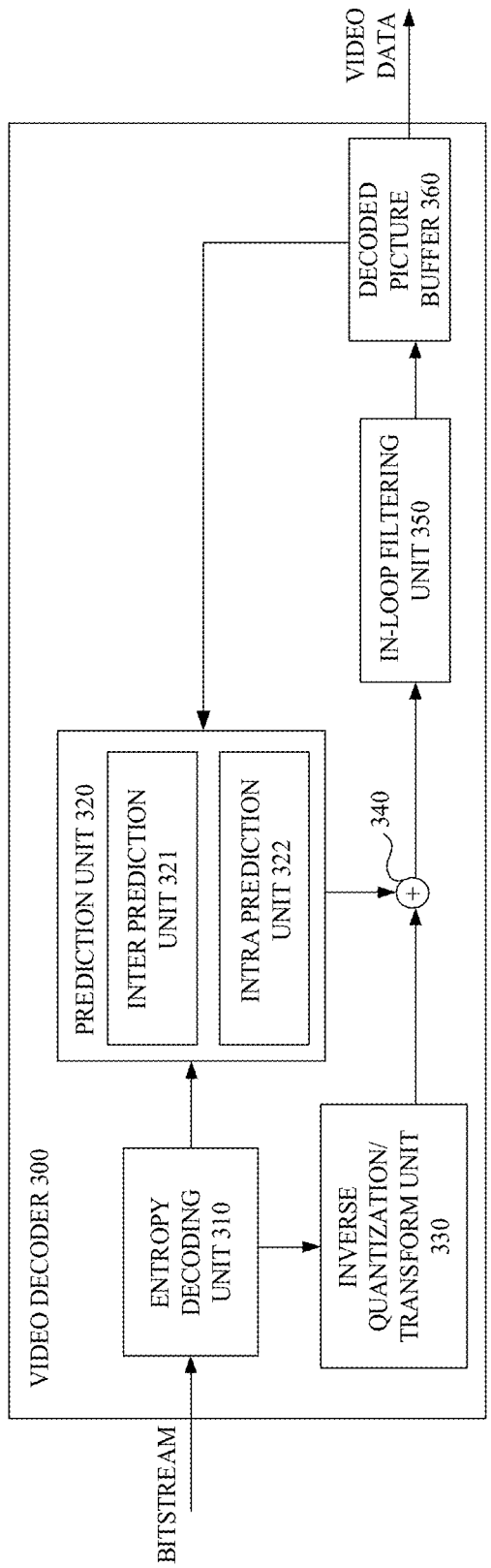
FIG. 3 is a schematic block diagram of a video decoding framework provided in embodiments of the disclosure.

FIG. 3 is a schematic block diagram of a video decoder provided in embodiments of the disclosure.

As illustrated in FIG. 3, the video decoder 300 includes an entropy decoding unit 310, a prediction unit 320, an inverse quantization/transform unit 330, a reconstruction unit 340, an in-loop filtering unit 350, and a decoded picture buffer 360. It should be noted that the video decoder 300 may include more, fewer, or different functional components.

The video decoder 300 may receive a bitstream. The entropy decoding unit 310 may parse the bitstream to extract syntax elements from the bitstream. As part of parsing the bitstream, the entropy decoding unit 310 may parse entropy-coded syntax elements in the bitstream. The prediction unit 320, the inverse quantization/transform unit 330, the reconstruction unit 340, and the in-loop filtering unit 350 may decode video data according to the syntax elements extracted from the bitstream, that is, generate decoded video data.

In some embodiments, the prediction unit 320 includes an inter prediction unit 321 and an intra prediction unit 322.

The intra prediction unit 322 may perform intra prediction to generate a prediction block of a PU. The intra prediction unit 322 may use an intra-prediction mode to generate a prediction block of the PU based on a sample block of spatially neighbouring PUs. The intra prediction unit 322 may also determine an intra prediction mode for the PU from one or more syntax elements parsed from the bitstream.

The inter prediction unit 321 can construct a first reference picture list (list 0) and a second reference picture list (list 1) according to the syntax elements parsed from the bitstream. In addition, the entropy decoding unit 310 may parse motion information of the PU if the PU is encoded using inter prediction. The inter prediction unit 321 may determine one or more reference blocks of the PU according to the motion information of the PU. The inter prediction unit 321 may generate a prediction block of the PU based on one or more reference blocks of the PU.

The inverse quantization/transform unit 330 may perform inverse quantization on (that is, de-quantize) a transform coefficient associated with a TU. The inverse quantization/transform unit 330 may use a QP value associated with a CU of the TU to determine the degree of quantization.

After inverse quantization of the transform coefficient, the inverse quantization/transform unit 330 may perform one or more inverse transformations on the inverse-quantized transform coefficient to generate a residual block associated with the TU.

The reconstruction unit 340 uses the residual block associated with the TU of the CU and the prediction block of the PU of the CU to reconstruct a sample block of the CU. For example, the reconstruction unit 340 may add samples in the residual block to corresponding samples in the prediction block to reconstruct the sample block of the CU to obtain the reconstructed picture block.

The in-loop filtering unit 350 may perform deblocking filtering to reduce blocking artifacts of the sample block associated with the CU.

In some embodiments, the loop filtering unit 350 includes a deblocking filtering unit, a sample adaptive compensation (SAO) unit, and an adaptive loop filtering (ALF) unit.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

A basic process of video decoding is as follows. The entropy decoding unit 310 may parse the bitstream to obtain prediction information, a quantized coefficient matrix, etc. of the current block, and the prediction unit 320 performs intra prediction or inter prediction on the current block based on the prediction information to generate a prediction block of the current block. The inverse quantization/transform unit 330 uses the quantized coefficient matrix obtained from the bitstream to perform inverse quantization and inverse transformation on the quantized coefficient matrix to obtain a residual block. The reconstruction unit 340 adds the prediction block and the residual block to obtain a reconstructed block. The reconstructed blocks form a reconstructed picture. The in-loop filtering unit 350 performs in-loop filtering on the reconstructed picture on a picture basis or on a block basis to obtain a decoded picture. The decoded picture may also be referred to as a reconstructed picture. On the one hand, the reconstructed picture may be displayed by the display device, and on the other hand, the reconstructed picture may be stored in the decoded picture buffer 360 to serve as a reference picture of a subsequent picture for inter prediction.

The above is the basic process of video coder under a block-based hybrid coding framework. With development of technology, some modules or steps of the framework or process may be optimized. The disclosure is applicable to the basic process of the video coder under the block-based hybrid coding framework, but is not limited to the framework and process.

Hereinafter, technologies related to quantization involved in the disclosure will be described.

Quantization and inverse quantization are closely related to coefficient coding. The purpose of quantization is to scale transform coefficients, so that the number of bits consumed in encoding coefficients can be reduced.

In some embodiments, there is a case where the transform is skipped, and in this case, the object to be quantized is the residual, that is, the residual is directly scaled and then encoded.

Exemplarily, the quantization may be achieved using the following formula (1):

$$q_i = \text{round}\left(\frac{t_i}{qstep}\right) \tag{1}$$

where $t_i$ is the transform coefficient, qstep is the quantization step size, which is related to the quantization parameter set in the profile, $q_i$ is the quantized coefficient, round is the rounding process, which is not limited to rounding up (ceiling) or rounding down (floor), etc., and the quantization process is controlled by the encoder.

Exemplarily, the inverse quantization may be achieved using the following formula (2):

$$t'_i = q_i \cdot qstep \tag{2}$$

where $t_i'$ is the reconstructed transform coefficient, and due to the accuracy loss caused in the rounding process, $t_i'$ is different from $t_i$.

The quantization reduces the accuracy of the transform coefficients, and the loss of accuracy is irreversible. The encoder typically measures the cost of quantization through a rate-distortion cost function.

Exemplarily, the cost of quantization is determined using the following formula (3):

$$J = D + \lambda \cdot R = (t_i - t'_i)^2 + \lambda \cdot B(q_i) \tag{3}$$

where B ( ) is the bits consumed in encoding the quantized coefficient $q_i$, estimated by the encoder.

Theoretically, no matter how the encoder decides the value of $q_i$, the inverse quantization process at the decoding end will not change, so the encoder can decide $q_i$ more freely. Generally, the encoder will adjust each $q_i$ based on the principle of minimizing the overall cost of the current block, to achieve optimization of the overall cost. Such a process is called rate-distortion optimization quantization, which is also widely used in video encoding.

In some embodiments, the quantized coefficients can be encoded or decoded with a multi-symbol arithmetic coding method, and each quantized coefficient can be indicated by one or more multi-symbol identifiers. Specifically, according to the magnitude of the quantized coefficient, the quantized coefficient can be represented by the following multi-symbol identifiers in segments.

Identifier 1 represents a part of 0 to 3, with a total of 4 symbols (0, 1, 2, 3). When the symbol of identifier 1 is 3, identifier 2 needs to be further encoded/decoded.

Identifier 2 represents a part of 3 to 6, with a total of 4 symbols (0, 1, 2, 3). When the symbol of identifier 2 is 3, identifier 3 needs to be further encoded/decoded.

Identifier 3 represents a part of 6 to 9, with a total of 4 symbols (0, 1, 2, 3). When the symbol of identifier 3 is 3, identifier 4 needs to be further encoded/decoded.

Identifier 4 represents a part of 9 to 12, with a total of 4 symbols (0, 1, 2, 3). When the symbol of identifier 4 is 3, identifier 5 needs to be further encoded/decoded.

Identifier 5 represents a part of 12 to 15, with a total of 4 symbols (0, 1, 2, 3). When the symbol of identifier 5 is 3, the part greater than or equal to 15 needs to be further encoded/decoded.

The part greater than or equal to 15 is encoded/decoded by using exponential Columbus and does not rely on the context model, while for identifiers 1 to 5, the context model is used, where identifier 1 has a separate set of context models and identifiers 2 to 5 share a set of context models. In addition, if the current coefficient is a non-zero coefficient, it is necessary to encode/decode the sign.

Identifier 1 to identifier 5 of coefficients are encoded and decoded in a backward scan order, while the sign and the part of absolute values greater than 15 of coefficients are encoded and decoded in a forward scan order, where the scan order is selected according to the transform mode selected for the transform block. In the AVM, as illustrated in FIGS. 4A to 4D, the scan order can include Zig-Zag scan, Diagonal scan, Column scan, and Row scan. The scan order is illustrated in FIGS. 4A to 4D, and the order of successive scan in the order of 0, 1, 2, . . . 14, 15 from the position of index 0 at the upper left corner of the transform block to the position at the lower right corner (for example, the position of index 15 in the figure) of the transform block is the scan order.

When identifier 1 to identifier 5 of coefficients are encoded and decoded in the backward scan order, encoding and decoding starts from the first non-zero coefficient. When the sign and the part of absolute values greater than 15 of coefficients are encoded and decoded in the forward scan order, the encoding and decoding stops when the last non-zero coefficient is reached. For example, in several cases illustrated in FIGS. 4A to 4D, the first non-zero coefficient can be at any position among positions of indexes 0-15.

The encoding/decoding process of various identifiers in the transform block is as follows.

First, identifiers 1-5 are encoded/decoded according to the scan order from the last non-zero coefficient to the upper left corner of the transform block.

Then, in the order from the upper left corner of the transform block to the last non-zero coefficient, the sign(s) of the non-zero coefficient(s) and the part of absolute values greater than 15 of coefficients are encoded/decoded, respectively. If the coefficient at the upper left corner is non-zero, the sign is encoded/decoded by using the context model, and the non-zero coefficient(s) at the remaining position(s) is encoded/decoded by using the equal probability model.

Exemplarily, the encoding syntax is illustrated in Table 1 below.

TABLE 1

| | |
|---|---|
| for ( c = eob − 1; c >= 0; c−− ) { | |
|   pos = scan[ c ] | |
|   if (c == ( eob − 1 ) ) { | |
|     coeff_base_eob | S( ) |
|     level = coeff_base_eob + 1 | |
|   } else { | |
|     coeff_base | S( ) |
|     level = coeff_base | |
|   } | |
|   if ( level > NUM_BASE_LEVELS ) { | |
|     for ( idx = 0; | |
|       idx < COEFF_BASE_RANGE / | |
|       ( BR_CDF_SIZE − 1 ); | |
|       idx++ ) { | |

TABLE 1-continued

| | |
|---|---|
|       coeff_br | S( ) |
|       level += coeff_br | |
|       if ( coeff_br < ( BR_CDF_SIZE − 1 ) ) | |
|         break | |
|     } | |
|   } | |
|   Quant[ pos ] = level | |
| } | |
| for ( c = 0; c < eob; c++ ) { | |
|   pos = scan[ c ] | |
|   if ( Quant[ pos ] != 0 ) { | |
|     if ( c == 0 ) { | |
|       dc_sign | S( ) |
|       sign = dc_sign | |
|     } else { | |
|       sign_bit | L(1) |
|       sign = sign_bit | |
|     } | |
|   } else { | |
|     sign = 0 | |
|   } | |
|   if ( Quant[ pos ] > | |
|     ( NUM_BASE_LEVELS + COEFF_BASE_RANGE ) ) { | |
|     length = 0 | |
|     do { | |
|       length++ | |
|       golomb_length_bit | L(1) |
|     } while ( !golomb_length_bit ) | |
|     x = 1 | |
|     for ( i = length − 2; i >= 0; i−− ) { | |
|       golomb_data_bit | L(1) |
|       x = ( x << 1 ) | golomb_data_bit | |
|     } | |
|     Quant[ pos ] = x + COEFF_BASE_RANGE + NUM_BASE_LEVELS | |
|   } | |
|   if ( pos == 0 && Quant[ pos ] > 0 ) { | |
|     dcCategory = sign ? 1 : 2 | |
|   } | |
|   Quant[ pos ] = Quant[ pos ] & 0xFFFFF | |
|   culLevel += Quant[ pos ] | |
|   if ( sign ) | |
|     Quant[ pos ] = − Quant[ pos ] | |
| } | |

In Table 1 above, S( ) is a multi-symbol context model coding, and L(1) is a bypass coding.

At present, the encoding method of the quantized coefficient is generally to completely encode the sign and the absolute value of the quantized coefficient, which takes up more bits and has a high encoding cost.

In the embodiment of the disclosure, in the encoding process of the quantized coefficient, at least one quantized coefficient in the current region is hidden according to the parity related to the quantized coefficients in the current region, to reduce the encoding cost.

Hereinafter, the technical solutions provided in embodiments of the disclosure will be described in detail with reference to specific embodiments.

Figures 4A, 4B, 4C, 4D, 5:
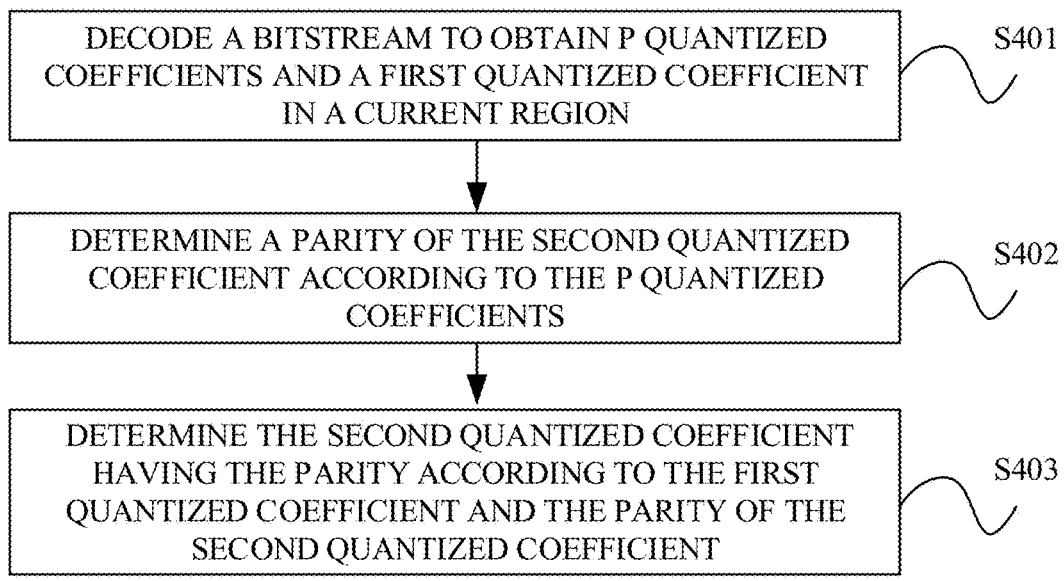
FIGS. 4A to 4D are schematic diagrams of scan orders according to the disclosure.
FIG. 5 is a schematic flow chart of a video decoding method provided in embodiments of the disclosure.

First, combined with FIG. 5, the decoding end is introduced as an example.

FIG. 5 is a schematic flow chart of a video decoding method provided in embodiments of the disclosure. The embodiment of the disclosure is applied to the video decoder illustrated in FIG. 1 and FIG. 3. As illustrated in FIG. 5, the method of the embodiment of the disclosure includes the following.

S401, a bitstream is decoded to obtain P quantized coefficients and a first quantized coefficient in a current region.

The current region is a region in the current block that includes at least one non-zero quantized coefficient, and the first quantized coefficient is obtained by performing parity hiding on a second quantized coefficient in the current region.

For convenience of description, in the embodiment of the disclosure, the quantized coefficient with hidden parity is referred as the first quantized coefficient.

In some embodiments, the first quantized coefficient with hidden parity is also referred to as a hidden coefficient.

In the embodiment of the disclosure, the current block is partitioned into one or more regions, for example, N regions, and N is a positive integer. To reduce the encoding cost, parities of one or more quantized coefficients in the region can be hidden according to the parity related to the quantized coefficients in the same region, for example, according to the parity of the sum of the absolute values of the quantized coefficients in the region, to decrease the quantized coefficient with hidden parity. For example, the second quantized coefficient with parity to be hidden is a1 and a1 is an odd number. A processing method corresponding to an odd number is adopted to process a1, to obtain the first quantized coefficient a2 corresponding to a1, where a2 is smaller than a1. In this way, encoding of a2 takes fewer bits than encoding of a1, and the encoding cost can be reduced.

In one example, the P quantized coefficients are all quantized coefficients in the current region except the first quantized coefficient.

In another example, the P quantized coefficients are part of the quantized coefficients in the current region.

Optionally, the first quantized coefficient in the current region is not included in the P quantized coefficients.

In some embodiments, the above quantized coefficient is obtained by quantizing the transform coefficient. For example, the encoding end predicts the current block to obtain the prediction value of the current block, and the original value of the current block is subtracted from the prediction value to obtain the residual value of the current block. The encoding end transforms the residual value to obtain the transform coefficient of the current block, quantizes the transform coefficient to obtain the quantized coefficient, and then encodes the quantized coefficient to obtain the bitstream. In this way, the decoding end receives the bitstream, decodes the bitstream to obtain the quantized coefficient, inversely quantizes the quantized coefficient to obtain the transform coefficient of the current block, and then inversely transforms the transform coefficient to obtain the residual value of the current block. Optionally, in the example, the above current block may also be referred to as a current transform block.

In some embodiments, the above quantized coefficient is obtained by quantizing the residual value. For example, the encoding end predicts the current block to obtain the prediction value of the current block, and the original value of the current block is subtracted from the prediction value to obtain the residual value of the current block. The encoding end quantizes the residual value to obtain the quantized coefficient, and then encodes the quantized coefficient to obtain the bitstream. In this way, the decoding end receives the bitstream, decodes the bitstream to obtain the quantized coefficient, and inversely quantizes the quantized coefficient to obtain the residual value of the current block.

In some embodiments, the quantized coefficient can be understood as a numerical value composed of an absolute value and a sign that are decoded from the bitstream. The absolute value includes a value of an identifier corresponding to the quantized coefficient. If the value of the quantized coefficient exceeds 15, an absolute value exceeding 15 is also included.

In the embodiment of the disclosure, the current block may be partitioned into N regions, and the sizes of the N regions may be the same or different.

In the embodiment of the disclosure, the decoding end and the encoding end adopt the same region partition method to partition the current block into N regions.

In some embodiments, both the decoding end and the encoding end adopt a default region partition method to partition the current block into N regions.

In some embodiments, the encoding end may indicate the region partition method of the current block to the decoding end. For example, flag A is encoded in the bitstream, and flag A is used to indicate the region partition method of the current block. In this way, the decoding end obtains flag A by decoding the bitstream, and determines the region partition method of the current block according to flag A.

Optionally, flag A can be a sequence-level flag for indicating that all decoding blocks in the sequence can be partitioned into N regions by adopting the region partition method.

Optionally, flag A can be a frame-level flag for indicating that all decoding blocks in the picture can be partitioned into N regions by adopting the region partition method.

Optionally, flag A can be a slice-level flag for indicating that all decoding blocks in the picture slice can be partitioned into N regions by adopting the region partition method.

Optionally, flag A can be a block-level flag for indicating that the current block can be partitioned into N regions by adopting the region partition method.

In the embodiment of the disclosure, the decoding end determines the P quantized coefficients and the first quantized coefficient in the current region includes as follows, which is not limited to the following examples.

In example 1, the decoding end decodes region by region to obtain the quantized coefficient in each region. For example, after the quantized coefficients in one region is decoded, the decoding end determines the P quantized coefficients and the first quantized coefficient in the region. Then, the decoding end decodes the quantized coefficients in the next region, and determines the P quantized coefficients and the first quantized coefficient in the next region according to the quantized coefficients in the next region. That is, in the embodiment, the decoding end can determine the P quantized coefficients and the first quantized coefficient in the current region before all quantized coefficients of the current block are completely decoded. For example, the region partition method is taking K samples in the scan direction as one region. In this way, when the decoding end decodes to obtain K quantized coefficients, the decoding end determines the P quantized coefficients and the first quantized coefficient among the K quantized coefficients according to the K quantized coefficients.

In example 2, after all quantized coefficients of the current block are determined, the decoding end determines the P quantized coefficients and the first quantized coefficient in the current region, which includes the following.

S401-A1, the bitstream is decoded to obtain decoded information of the current block.

S401-A2, the current block is partitioned into N regions, where N is a positive integer.

S401-A3, the P quantized coefficients and the first quantized coefficient are obtained from the decoded information of the current block.

In example 2, the decoding end first decodes the bitstream to obtain the decoded information of the current block, and the decoded information includes quantized coefficients in different regions in the current block. Next, the current block is partitioned into N regions according to the region partition method. Assuming that the current region is the k-th region among the N regions, decoded information corresponding to the k-th region among the decoded information of the current block is determined as decoded information of the current region. The decoded information of the current region includes the P quantized coefficients and the first quantized coefficient in the current region.

In S401-A2, the method of partitioning the current block into the N regions includes, but is not limited to, the following.

Method 1, according to a scan order, the current block is partitioned into the N regions.

Optionally, at least two of the N regions include the same number of quantized coefficients.

Optionally, at least two of the N regions include different numbers of quantized coefficients.

In one example, according to the scan direction, every M non-zero quantized coefficients in the current block are partitioned into one region, to obtain the N regions. Each of the N regions includes M non-zero quantized coefficients. At least one of the N regions includes one or more hidden coefficients. In the example, if the number of the non-zero quantized coefficients included in the last region is not M, the last region is determined as a separate region, or the last region and the previous region are combined into one region.

In another example, according to the scan direction, every K samples in the current block are partitioned into one region, to obtain N regions. For example, for a transform block of 8×8 size using the inverse ZigZag scan order, when each region is equal in size, i.e., each region contains 16 coefficients, as illustrated in FIG. 6, the current block is partitioned into 4 regions. In the example, the N partitioned regions have the same size, and each region includes K samples. Among the N regions, there may be a region in which quantized coefficients are all 0, or there may be a region in which no hidden coefficient is included. That is, at least one of the N regions includes one or more hidden coefficients. In the example, if the number of the quantized coefficients included in the last region is not K, the last region is determined as a separate region, or the last region and the previous region are combined into one region.

Method 2, according to a spatial position, the current block is partitioned into the N regions.

In one example, the N regions are sub-blocks of the current block. For example, the current block is evenly partitioned into N sub-blocks. Exemplarily, the size of each sub-block is 4*4. In the example, among the N regions, there may be a region in which quantized coefficients are all 0, or there may be a region in which no hidden coefficient is included. That is, at least one of the N regions includes one or more hidden coefficients.

In another example, multiple samples adjacent in the spatial position are partitioned into one sub-block according to the spatial position relationship of samples in the current block, and each sub-block includes at least one non-zero quantized coefficient.

In the embodiment of the disclosure, the method of partitioning the current block into the N regions may include other methods in addition to the above examples, and the embodiment of the disclosure is not limited thereto.

In the embodiment of the disclosure, the current region includes at least one first quantized coefficient, that is, hidden coefficient.

In one example, the first quantized coefficient may be any non-zero quantized coefficient in the current region default at the encoding end and the decoding end.

In another example, the first quantized coefficient may be a non-zero quantized coefficient with the largest absolute value in the current region.

In another example, the first quantized coefficient is a non-zero quantized coefficient located at the K-th position in the scan order in the current region, where K is less than or equal to the number of non-zero quantized coefficients in the current region. For example, as illustrated in FIG. 6, 16 coefficients are included in the current region, and the 16th non-zero quantized coefficient and/or the 15th non-zero quantized coefficient in the scan order can be regarded as the first quantized coefficient in the current region.

In some embodiments, a flag may be used to indicate whether the technology of hiding the parity of the quantized coefficient provided in embodiments of the disclosure is allowed for the current block. In some embodiments, the technology of hiding the parity of the quantized coefficient provided in embodiments of the disclosure is also referred to as the parity hiding technology.

Exemplarily, the at least one flag set can correspond to different levels, for indicating whether the parity of the quantized coefficient is allowed to be hidden in the corresponding level.

Optionally, the at least one flag includes at least one of a sequence-level flag, a picture-level flag, a slice-level flag, a unit-level flag, or a block-level flag.

For example, the at least one flag includes the sequence-level flag, for indicating whether the parity of the quantized coefficient is allowed to be hidden for the current sequence. For example, if the value of the sequence-level flag is 1, it indicates that the parity of the quantized coefficient is allowed to be hidden for the current sequence, and if the value of the sequence-level flag is 0, it indicates that the parity of the quantized coefficient is not allowed to be hidden for the current sequence.

Optionally, if at least one flag includes the sequence-level flag, the sequence-level flag can be located in a sequence header.

For another example, the at least one flag includes the picture-level flag, and the picture-level flag is used to indicate whether the parity of the quantized coefficient is allowed to be hidden for the current picture. For example, if the value of the picture-level flag is 1, it indicates that the parity of the quantized coefficient is allowed to be hidden for the current picture, and if the value of the picture-level flag is 0, it indicates that the parity of the quantized coefficient is not allowed to be hidden for the current picture.

Optionally, if the at least one flag includes the picture-level flag, the picture-level flag can be located in a picture header.

For another example, the at least one flag includes the slice-level flag, for indicating whether the parity of the quantized coefficient is allowed to be hidden for the current slice. For example, if the value of the slice-level flag is 1, it indicates that the parity of the quantized coefficient is allowed to be hidden for the current slice, and if the value of the slice-level flag is 0, it indicates that the parity of the quantized coefficient is not allowed to be hidden for the current slice.

Optionally, if at least one flag includes the slice-level flag, the slice-level flag can be located in a slice header.

For another example, the at least one flag includes a unit-level flag, for indicating whether the parity of the quantized coefficient is allowed to be hidden for the current CTU. For example, if the value of the unit-level flag is 1, it indicates that the parity of the quantized coefficient is allowed to be hidden for the current CTU, and if the value of the unit-level flag is 0, it indicates that the parity of the quantized coefficient is not allowed to be hidden for the current CTU.

For another example, the at least one flag includes the block-level flag, for indicating whether the parity of the quantized coefficient is allowed to be hidden for the current block. For example, if the value of the block-level flag is 1, it indicates that the parity of the quantized coefficient is allowed to be hidden for the current block, and if the value of the block-level flag is 0, it indicates that the parity of the quantized coefficient is not allowed to be hidden for the current block.

In this way, the decoding end first decodes the bitstream to obtain the at least one flag, and determines whether the parity of the quantized coefficient is allowed to be hidden for the current block according to the at least one flag. If it is determined according to the at least one flag that the parity of the quantized coefficient is not allowed to be hidden for the current block, the method of the embodiment of the disclosure is skipped, and the decoded quantized coefficient is inversely quantized directly, to obtain the transform coefficient. If it is determined according to the at least one flag that the parity hiding technology provided in the embodiment of the disclosure is allowed to be used, the method of the embodiment of the disclosure is executed.

For example, the at least one flag includes the sequence-level flag, the picture-level flag, the slice-level flag, the unit-level flag, and the block-level flag. In this case, the decoding end first decodes the bitstream to obtain the sequence-level flag. If the sequence-level flag indicates that the parity hiding technology of the quantized coefficient provided in the embodiment of the disclosure is not allowed to be used for the current sequence, the method of the embodiment of the disclosure is skipped, and the traditional method is adopted to inversely quantize the current block. If the sequence-level flag indicates that the parity hiding technology of the quantized coefficient provided in the embodiment of the disclosure is allowed to be used for the current sequence, the bitstream is continued to be decoded to obtain the picture-level flag. If the picture-level flag indicates that the parity hiding technology of the quantized coefficient provided in the embodiment of the disclosure is not allowed to be used for the current picture, the method of the embodiment of the disclosure is skipped, and the traditional method is adopted to inversely quantize the current block. If the picture-level flag indicates that the parity hiding technology of the quantized coefficient provided in the embodiment of the disclosure is allowed to be used for the current picture, the bitstream is continued to be decoded to obtain the slice-level flag. If the slice-level flag indicates that the parity hiding technology of the quantized coefficient provided in the embodiment of the disclosure is not allowed to be used for the current slice, the method of the embodiment of the disclosure is skipped, and the traditional method is adopted to inversely quantize the current block. If the slice-level flag indicates that the parity hiding technology of the quantized coefficient provided in the embodiment of the disclosure is allowed to be used for the current slice, the bitstream is continued to be decoded to obtain the unit-level flag. If the unit-level flag indicates that the parity hiding technology of the quantized coefficient provided in the embodiment of the disclosure is not allowed to be used for the current CTU, the method of the embodiment of the disclosure is skipped, and the traditional method is adopted to inversely quantize the current block. If the unit-level flag indicates that the parity hiding technology of the quantized coefficient provided in the embodiment of the disclosure is allowed to be used for the current CTU, the bitstream is continued to be decoded to obtain the block-level flag. If the block-level flag indicates that the parity hiding technology of the quantized coefficient provided in the embodiment of the disclosure is not allowed to be used for the current block, the method of the embodiment of the disclosure is skipped, and the traditional method is adopted to inversely quantize the current block. If the block-level flag indicates that the parity hiding technology of the quantized coefficient provided in the embodiment of the disclosure is allowed to be used for the current block, the embodiment of the disclosure is executed.

In some embodiments, the parity hiding technology of the quantized coefficient provided in the embodiments of the disclosure is mutually exclusive to the target transform mode, where target transform mode includes a secondary transform or multiple transforms, etc. In this case, when the decoding end determines to transform the current block in the target transform mode, the decoding end skips the technical solution provided in the embodiment of the disclosure, for example, skips the following S402.

In the embodiment of the disclosure, according to the above steps, after the P quantized coefficients and the first quantized coefficient in the current region are obtained by decoding, the following S402 is executed.

S402, a parity of the second quantized coefficient is determined according to the P quantized coefficients.

In the embodiment of the disclosure, to reduce the encoding cost, the encoding end performs parity hiding on the second quantized coefficient according to the parity of the second quantized coefficient in the current region, to obtain the first quantized coefficient, encodes the first quantized coefficient, and uses the P quantized coefficients in the current region to indicate the parity of the second quantized coefficient. In this way, after the P quantized coefficients in the current region are obtained according to the above steps, the decoding end can determine the parity of the second quantized coefficient according to the P quantized coefficients in the current region.

The method of determining the parity of the second quantized coefficient in the current region according to the P quantized coefficients in the current region in S402 is not limited in the embodiment of the disclosure.

For example, the parity of the second quantized coefficient in the current region is determined with a binary feature (0 or 1) of the P quantized coefficients in the current region.

In some embodiments, the above S402 includes the following S402-A.

S402-A, the parity of the second quantized coefficient is determined according to a parity corresponding to the P quantized coefficients.

In example 1, if the parity corresponding to the P quantized coefficients is indicated by a parity of a sum of first absolute values of the P quantized coefficients, S402-A includes: determining the parity of the second quantized coefficient according to the parity of the sum of the first absolute values of the P quantized coefficients.

The first absolute values of the quantized coefficients are part or all of the absolute values of the P quantized coefficients, for example, the first absolute value is a part of the absolute value less than 15 of the quantized coefficient.

In the embodiment of the disclosure, the absolute value of the quantized coefficient is indicated by one or more identifiers. If the absolute value of the quantized coefficient is greater than 15, the absolute value of the quantized coefficient further includes a part greater than 15.

Based on this, in the embodiment of the disclosure, all of the absolute values of the quantized coefficients refer to all decoded absolute values of the quantized coefficients, including the value of each identifier. If the absolute value of the quantized coefficient is greater than 15, the value of the part greater than 15 is further included.

Optionally, part of the absolute values of the quantized coefficients refers to values of all or part of the identifiers. For example, the decoding end determines the parity of the second quantized coefficient according to a parity of a sum of absolute values of values of identifier 1 of the P quantized coefficients.

For example, if the sum of the first absolute values of the P quantized coefficients is an even number, the second quantized coefficient is determined to be an even number.

Note that, in example 1, when the parity of the second quantized coefficient is inconsistent with the parity of the sum of the first absolute values of the P quantized coefficients, the encoding end modifies the parity of at least one coefficient of the P quantized coefficients. For example, if the second quantized coefficient is an odd number and the sum of the first absolute values of the P quantized coefficients is an even number, the smallest quantized coefficient among the P quantized coefficients is added or subtracted by 1, to modify the sum of the first absolute values of the P quantized coefficients to be an odd number. For another example, if the second quantized coefficient is an even number and the sum of the first absolute values of the P quantized coefficients is an odd number, the smallest quantized coefficient among the P quantized coefficients is added or subtracted by 1, to modify the sum of the first absolute values of the P quantized coefficients to be an even number.

In example 2, if the parity corresponding to the P quantized coefficients is a parity of the number of target quantized coefficients among the P quantized coefficients, S402-A includes: determining the target quantized coefficients among the P quantized coefficients, and determining the parity of the second quantized coefficient according to the parity of the number of the target quantized coefficients among the P quantized coefficients.

The target quantized coefficient is any one of the following among the P quantized coefficients: a non-zero quantized coefficient, a non-zero quantized coefficient having an even value, a quantized coefficient having an even value, or a quantized coefficient having an odd value.

In one example, if the target quantized coefficient is a non-zero quantized coefficient among the P quantized coefficients, the parity of the second quantized coefficient can be determined according to the parity of the number of the non-zero quantized coefficients among the P quantized coefficients.

For example, if the number of the non-zero quantized coefficients among the P quantized coefficients is an odd number, the second quantized coefficient is determined to be an odd number.

For example, if the number of the non-zero quantized coefficients among the P quantized coefficients is an even number, the second quantized coefficient is determined to be an even number.

It should be noted that in the example, if the parity of the second quantized coefficient is inconsistent with the parity of the number of the non-zero quantized coefficients among the P quantized coefficients, the encoding end modifies at least one of the P quantized coefficients. For example, if the second quantized coefficient is an odd number and the number of the non-zero quantized coefficients among the P quantized coefficients is an even number, one quantized coefficient with a value of zero among the P quantized coefficients can be adjusted to 1, or a value of the smallest quantized coefficient among the P quantized coefficients can be adjusted to 0, so that the number of the non-zero quantized coefficients among the P quantized coefficients is an odd number. For another example, if the second quantized coefficient is an even number and the number of the non-zero quantized coefficients among the P quantized coefficients is an odd number, one quantized coefficient with the value of zero among the P quantized coefficients can be adjusted to 1, or the value of the smallest quantized coefficient among the P quantized coefficients can be adjusted to 0, so that the number of the non-zero quantized coefficients among the P quantized coefficients is an even number.

In another example, if the target quantized coefficient is a non-zero quantized coefficient with an even value among the P quantized coefficients, the parity of the second quantized coefficient can be determined according to the parity of the number of non-zero quantized coefficients with even values among the P quantized coefficients.

For example, if the number of the non-zero quantized coefficients with even values among the P quantized coefficients is an odd number, the second quantized coefficient is determined to be an odd number.

For example, if the number of the non-zero quantized coefficients with even values among the P quantized coefficients is an even number, the second quantized coefficient is determined to be an even number.

It should be noted that in the example, if the parity of the second quantized coefficient is inconsistent with the parity of the number of the non-zero quantized coefficients with even values among the P quantized coefficients, the encoding end modifies at least one coefficient among the P quantized coefficients. For example, if the second quantized coefficient is an odd number, and the number of the non-zero quantized coefficients with even values among the P quantized coefficients is an even number, then one quantized coefficient with a value of 0 among the P quantized coefficients can be adjusted to 2, or a value of the smallest non-zero quantized coefficient among the P quantized coefficients can be increased by 1 or decreased by 1, so that the number of the non-zero quantized coefficients with even values among the P quantized coefficients is an odd number. For another example, if the second quantized coefficient is an even number, and the number of the non-zero quantized coefficients with even values among the P quantized coefficients is an odd number, then one quantized coefficient with the value of 0 among the P quantized coefficients can be adjusted to 2, or the value of the smallest non-zero quantized coefficient among the P quantized coefficients can be increased by 1 or decreased by 1, so that the number of the non-zero quantized coefficients with even values among the P quantized coefficients is an even number.

In another example, if the target quantized coefficient is a quantized coefficient with an even value among the P quantized coefficients, the parity of the second quantized coefficient can be determined according to the parity of the number of quantized coefficients with even values among the P quantized coefficients. The quantized coefficients with even values include a quantized coefficient with a value of 0.

For example, if the number of the quantized coefficients with even values among the P quantized coefficients is an odd number, the second quantized coefficient is determined to be an odd number.

For example, if the number of the quantized coefficients with even values among the P quantized coefficients is an even number, the second quantized coefficient is determined to be an even number.

It should be noted that in the example, if the parity of the second quantized coefficient is inconsistent with the parity of the number of the quantized coefficients with even values among the P quantized coefficients, the encoding end modifies at least one of the P quantized coefficients. For example, if the second quantized coefficient is an odd number, and the number of the quantized coefficients with even values among the P quantized coefficients is an even number, then one quantized coefficient with a value of zero among the P quantized coefficients can be adjusted to 1, or the smallest non-zero quantized coefficient among the P quantized coefficients can be adjusted to 0, so that the number of the quantized coefficients with even values among the P quantized coefficients is an odd number. For another example, if the second quantized coefficient is an even number, and the number of the quantized coefficients with even values among the P quantized coefficients is an odd number, then one quantized coefficient with the value of zero among the P quantized coefficients can be adjusted to 1, or the smallest non-zero quantized coefficient among the P quantized coefficients can be adjusted to 0, so that the number of the quantized coefficients with even values among the P quantized coefficients is an even number.

In another example, if the target quantized coefficient is a quantized coefficient with an odd value among P quantized coefficients, the parity of the second quantized coefficient can be determined according to the parity of the number of quantized coefficients with odd values among the P quantized coefficients.

For example, if the number of the quantized coefficients with odd values among the P quantized coefficients is an odd number, the second quantized coefficient is determined to be an odd number.

For example, if the number of the quantized coefficients with odd values among the P quantized coefficients is an even number, the second quantized coefficient is determined to be an even number.

It should be noted that in the example, if the parity of the second quantized coefficient is inconsistent with the parity of the number of the quantized coefficients with odd values among the P quantized coefficients, the encoding end modifies at least one of the P quantized coefficients. For example, if the second quantized coefficient is an odd number, and the number of the quantized coefficients with odd values among the P quantized coefficients is an even number, then one quantized coefficient with a value of zero among the P quantized coefficients can be adjusted to 1, or the smallest non-zero quantized coefficient among the P quantized coefficients can be adjusted to 0 or plus 1 or minus 1, so that the number of the quantized coefficients with odd values among the P quantized coefficients is an odd number. For another example, if the second quantized coefficient is an even number, and the number of the quantized coefficients with odd values among the P quantized coefficients is an odd number, then one quantized coefficient with the value of zero among the P quantized coefficients can be adjusted to 1, or the smallest non-zero quantized coefficient among the P quantized coefficients can be adjusted to 0 or plus 1 or minus 1, so that the number of the quantized coefficients with odd values among the P quantized coefficients is an even number.

Optionally, the encoding end adjusts the at least one coefficient among the P quantized coefficients by using an adjustment method with the lowest rate-distortion cost.

As can be seen from the above, in the embodiment of the disclosure, the parity of the second quantized coefficient is determined according to the parity of the preset features corresponding to other quantized coefficients in the current region.

According to each of the above implementations, after the parity of the second quantized coefficient in the current region is determined, the following S403 is executed.

S403, the second quantized coefficient having the parity is determined according to the first quantized coefficient and the parity of the second quantized coefficient.

As can be seen from the above, in the embodiment of the disclosure, to reduce the encoding cost, the encoding end hides the parity of the second quantized coefficient in the current region, to obtain the first quantized coefficient. Since the parity of the second quantized coefficient is hidden, it is indicated by the P quantized coefficients in the current region. In this way, when decoding the current region, the decoding end first decodes the bitstream, to obtain the P quantized coefficients and the first quantized coefficient in the current region, and then determines the parity of the second quantized coefficient according to the P quantized coefficients. In this way, the second quantized coefficient with parity can be reconstructed according to the first quantized coefficient and the parity of the second quantized coefficient, that is, reconstruction of the coefficient with parity hidden can be achieved.

In some embodiments, the decoding end reconstructs the second quantized coefficient in different ways according to the parity of the second quantized coefficient.

Case 1, if the second quantized coefficient is an odd number, the first calculation method is used to make calculation on the first quantized coefficient to obtain the second quantized coefficient.

The first calculation method used by the decoding end corresponds to the third calculation method of determining the first quantized coefficient by the encoding end.

The embodiment of the disclosure does not limit the specific forms of the first calculation method and the third calculation method, where the first calculation method can be understood as the inverse operation of the third calculation method.

Method 1, for a non-zero quantized coefficient, if the third calculation method used at the encoding end is that: the value of the second quantized coefficient added by one and then divided by two is equal to the first quantized coefficient. Correspondingly, the first calculation method used at the decoding end is that: the value of the second quantized coefficient is equal to the first quantized coefficient multiplied by two minus one.

Exemplarily, the first calculation method is as illustrated in formula (4):

$$C = 2 * val - 1 \qquad (4)$$

where C is the second quantized coefficient and val is the first quantized coefficient.

In method 1, if the second quantized coefficient is an odd number, according to the first calculation method in the above formula (4), the second quantized coefficient is determined.

For example, assuming that the current region includes 6 samples, by decoding the bitstream, the quantized coefficients corresponding to the 6 samples are 5, 6, 3, 2, 2, 0, respectively, and the last 5 quantized coefficients located at the scan position in the current region are determined as the P quantized coefficients. In this case, the P quantized coefficients in the current region are 6, 3, 2, 2, 0, respectively, where the first quantized coefficient is 5. Exemplarily, the parity of the second quantized coefficient is determined according to the parity of the sum of the first absolute values of the P quantized coefficients. The sum of the first absolute values of the P quantized coefficients is 13, which is an odd number, and thus the second quantized coefficient is determined to be an odd number. In this way, the decoding end can reconstruct the value of the second quantized coefficient as 5*2−1=9 according to the above formula (4).

From the above example, as can be seen, the second quantized coefficient, which has an original value of 9, is hidden as 5 through the parity hiding technology of the embodiment of the disclosure, which can reduce the number of bits required for encoding and greatly reduce the encoding cost.

It should be noted that the above formula (4) is only an example of the first calculation method involved in the embodiment of the disclosure. The first calculation method of the embodiment of the disclosure includes but is not limited to the above formula (4).

Case 2, if the second quantized coefficient is an even number, the second calculation method is used to make calculation on the first quantized coefficient to obtain second quantized coefficient.

The second calculation method adopted by the decoding end corresponds to the fourth calculation method of determining the first quantized coefficient by the encoding end.

The embodiment of the disclosure does not limit the specific forms of the second calculation method and the fourth calculation method, and the second calculation method can be understood as the inverse operation of the fourth calculation method.

In one possible implementation, if the fourth calculation method used at the encoding end is: dividing the value of the second quantized coefficient by two as the first quantized coefficient. Correspondingly, the second calculation method used at the decoding end is: multiplying the first quantized coefficient by two as the value of the second quantized coefficient.

Exemplarily, the second calculation method is as illustrated in formula (5):

$$C = 2 * val \quad (5)$$

where C is the second quantized coefficient and val is the first quantized coefficient.

In an example, if the second quantized coefficient is an even number, according to the second calculation method in the above formula (5), the current second quantized coefficient is determined.

For example, assuming that the current region includes 6 samples, by decoding the bitstream, the quantized coefficients corresponding to the 6 samples are 4, 3, 3, 2, 2, 0, respectively, and the last 5 quantized coefficients located at the scan position in the current region are determined as the P quantized coefficients. In this case, the P quantized coefficients in the current region are 3, 3, 2, 2, 0, respectively, and the first quantized coefficient is 4. Exemplarily, the parity of the current second quantized coefficient can be determined according to the parity of the sum of the first absolute values of the P quantized coefficients. The sum of the first absolute values of the P quantized coefficients is 10, which is an even number, and the current second quantized coefficient is determined to be an even number. In this way, the decoding end can reconstruct the value of the second quantized coefficient as 4*2=8 according to the above formula (5).

From the above example, as can be seen, the second quantized coefficient with an original value of 8 is processed into the first quantized coefficient with a value of 4 through the method of the embodiment of the disclosure, which can reduce the number of bits required for encoding and reduce the encoding cost.

In some embodiments, the decoding end may determine the second quantized coefficient in the following manner, that is, the above S403 includes the following.

S404-A1, calculation is made on the first quantized coefficient with a preset calculation method, to obtain a calculation result.

S404-A2, the second quantized coefficient is obtained according to the parity of the second quantized coefficient and the calculation result.

The embodiments of the disclosure do not limit the specific form of the above preset calculation method.

In some embodiments, the preset calculation method includes multiplying the first quantized coefficient by two, that is, multiplying the value of the first quantized coefficient by two to obtain the calculation result.

Then, based on the parity of the second quantized coefficient and the calculation result, the second quantized coefficient is obtained. For example, a sum of the calculation result and a preset value is determined as the value of the second quantized coefficient. If the second quantized coefficient is an odd number, the preset value is 1, and if the second quantized coefficient is an even number, the preset value is 0.

For example, the decoding end can determine the second quantized coefficient according to the following formula (6):

$$\text{Quant}[pos] = \text{Quant}[pos] * 2 + \text{parity} \quad (6)$$

where Quant[pos] on the right of the equal sign is the first quantized coefficient at the current position, Quant[pos] on the left of the equal sign is the second quantized coefficient after reconstruction, and "parity" is the preset value. If the second quantized coefficient is an odd number, "parity"=1, and if the second quantized coefficient is an odd number, "parity"=0.

As can be seen from the above formula (6), by decoding bitstream, the quantized coefficient Quant[pos] at the current position is obtained. If the quantized coefficient at the current position is the first quantized coefficient, the second quantized coefficient at the current position is equal to Quant[pos] multiplied by 2 plus the value corresponding to the "parity".

The decoding end, according to the above method, can determine the second quantized coefficient corresponding to the first quantized coefficient in other regions in the current block, and the quantized coefficients of the current block composed of the second quantized coefficient in each region in the current block and other quantized coefficients whose parities are not hidden in the current block. Then, according to the quantized coefficients of the current block, the reconstructed value of the current block is determined.

In some embodiments, if the encoding end skips the transform operation, the residual value of the current block is directly quantized. Correspondingly, the decoding end inversely quantizes the quantized coefficient of the current block to obtain the residual value of the current block. In addition, the intra prediction and/or inter prediction method is used to determine the prediction value of the current block, and the prediction value of the current block is added to the residual value to obtain the reconstructed value of the current block.

In some embodiments, if the encoding end does not skip the transform operation, that is, the encoding end transforms the residual value of the current block to obtain the transform coefficient, and quantizes the transform coefficient. Correspondingly, the decoding end inversely quantizes the quantized coefficient of the current block to obtain the transform coefficient of the current block, and inversely transforms the transform coefficient to obtain the residual value of the current block. In addition, intra prediction and/or inter prediction methods are used to determine the prediction value of the current block, and the prediction value of the current block is added to the residual value to obtain the reconstructed value of the current block.

According to the video decoding method provided in the embodiment of the disclosure, the decoder decodes the bitstream to obtain the P quantized coefficients and the first quantized coefficient in the current region, and then determines the parity of the second quantized coefficient according to the P quantized coefficients, and determines the second quantized coefficient with parity according to the first quantized coefficient and the parity of the second quantized coefficient. In the embodiment of the disclosure, the parity of the second quantized coefficient in the current region is hidden with the P quantized coefficients in the current region, to obtain the first quantized coefficient. The first quantized coefficient is encoded during encoding, which can reduce the number of bits required for encoding and reduce the cost of video compression.

On the basis of the embodiment illustrated in FIG. 5, the video decoding method provided in the embodiment of the disclosure will be further described below with reference to FIG. 7.

Figure 7:
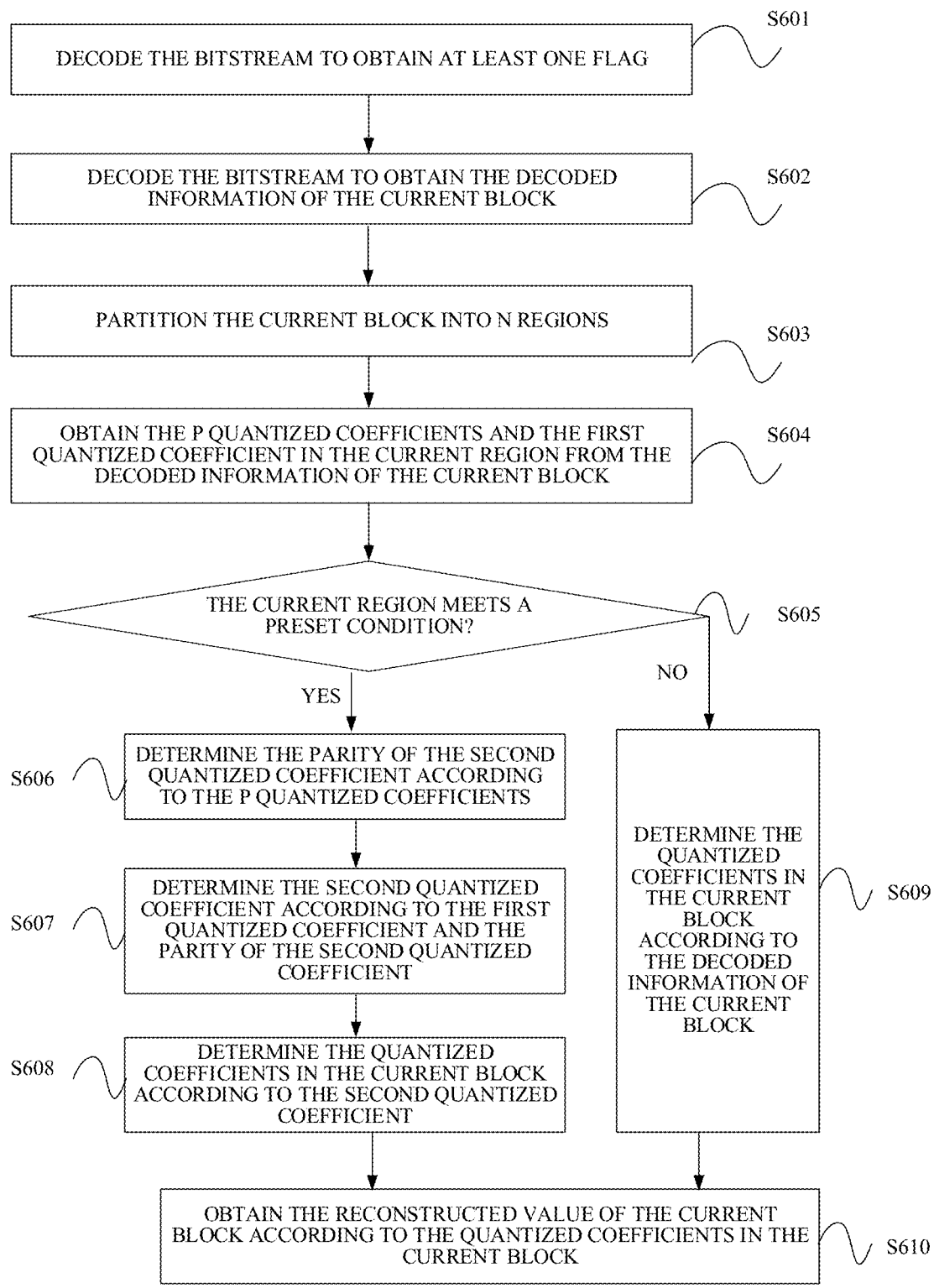
FIG. 7 is a schematic flow chart of a video decoding method provided in an embodiment of the disclosure.

FIG. 7 is a schematic flow chart of a video decoding method provided in an embodiment of the disclosure. As illustrated in FIG. 7, the method of the embodiment of the disclosure includes the following.

S601, the bitstream is decoded to obtain at least one flag.

The at least one flag is used to indicate whether the parity of the quantized coefficient is allowed to be hidden.

Optionally, the at least one flag includes at least one of a sequence-level flag, a picture-level flag, a slice-level flag, a unit-level flag, or a block-level flag.

Specifically, the decoding end first decodes the bitstream to obtain the at least one flag, and determines whether the parity of the quantized coefficient is allowed to be hidden in the current block according to the at least one flag.

If it is determined according to the at least one flag that the parity of the quantized coefficient of the current block is not allowed to be hidden, the following S602 and S609 are executed. That is, the bitstream is decoded to obtain decoded information of the current block, where the decoded information includes the quantized coefficients in the current block. In this case, since the parities of the quantized coefficients in the current block is not hidden, the subsequent inverse quantization process is executed.

If it is determined according to the at least one flag that the parity of the quantized coefficient of the current block is allowed to be hidden, the following S602 to S608 are performed.

S602, the bitstream is decoded to obtain the decoded information of the current block.

The decoded information of the current block includes the quantized coefficients in the current block.

Exemplarily, the decoding end first decodes identifiers 1 to 5, and then decodes the part of the absolute value greater than 15 of each quantized coefficient in the scan order from the last non-zero coefficient to the upper left corner of the transform block, to finally obtain the quantized coefficients in the current block.

S603, the current block is partitioned into N regions.

The embodiments of the disclosure do not limit the region partition method of the current block. For example, the current block is partitioned into the N regions according to a decoding scan order, or the current block is partitioned into the N regions according to a spatial positions of samples in the current block.

The N regions may be the same or different, which is not limited in the embodiment of the disclosure.

The implementation process of the above S603 can refer to the relevant description of the above S401-A2, which will not be repeated herein.

S604, the P quantized coefficients and the first quantized coefficient in the current region are obtained from the decoded information of the current block.

The current region is a region to be decoded among the N regions of the current block.

The decoded information of the current block includes the quantized coefficients in the current block. In this way, the P quantized coefficients and the first quantized coefficient included in the current region can be obtained from the decoded information of the current block.

In some embodiments, the P quantized coefficients are all quantized coefficients in the current region.

In some embodiments, the P quantized coefficients are partial quantized coefficients in the current region.

If the P quantized coefficients are partial quantized coefficients in the current region, the P quantized coefficients may include the quantized coefficient whose parity is hidden in the current region, or may not include the quantized coefficient whose parity is hidden in the current region. For example, the P quantized coefficients are other quantized coefficients in the current region except the first quantized coefficient whose parity is hidden.

The implementation process of the above S604 can refer to the relevant description of the above S401-A3, which will not be repeated herein.

S605, determine whether the current region meets a preset condition.

In the embodiment of the disclosure, the parity hiding technology provided in the disclosure is restricted. Specifically, if the current region meets the preset condition, it means that significant beneficial effects can be achieved by applying the parity hiding technology provided in the embodiment of the disclosure to the current region. In this case, the following S606 to S608 are performed. If the current region does not meet the preset condition, it means that no significant beneficial effects can be achieved by applying the parity hiding technology provided in the embodiment of the disclosure to the current region. In this case, the following S609 is performed.

The embodiments of the disclosure do not limit the specific contents of the preset condition, which can be set according to actual needs.

In a possible implementation, the preset condition includes at least one of the following conditions.

Condition 1, the number of non-zero quantized coefficients in the current region is greater than a first value.

Condition 2, in the current region, a distance between a first non-zero quantized coefficient and a last non-zero quantized coefficient in a decoding scan order is greater than a second value.

Condition 3, in the current region, a distance between the first non-zero quantized coefficient and a last quantized coefficient in the decoding scan order is greater than a third value.

Condition 4, in the current region, a sum of absolute values of the non-zero quantized coefficients is greater than a fourth value.

In the implementation, if the current region satisfies at least one of the above four conditions, the following S606 to S608 are executed.

In some embodiments, the above four conditions can also be combined with each other to form new constraints.

The embodiment of the disclosure does not limit the specific values of the first to fourth values, as long as the first to fourth values are all positive integers.

In one example, at least one of the first value, the second value, the third value, or the fourth value is a fixed value.

In another example, at least one of the first value, the second value, the third value and the fourth value is a non-fixed value, that is, a value determined by the encoding end according to the current encoding information.

In some embodiments, if at least one of the first value, the second value, the third value, or the fourth value is a non-fixed value, the encoding end signals the non-fixed value into the bitstream.

According to the above preset condition, when it is determined that the current region meets the above preset condition, there is a quantized coefficient with hidden parity in the current region, that is, the first quantized coefficient exists in the current region, and the following S606 is performed.

S606, the parity of the second quantized coefficient is determined according to the P quantized coefficients.

For example, the parity of the second quantized coefficient is determined according to the parity corresponding to the P quantized coefficients.

Exemplarily, the parity of the second quantized coefficient is determined according to the parity of the sum of the first absolute values of the P quantized coefficients.

Exemplarily, the parity of the second quantized coefficient is determined according to the parity of the number of the target quantized coefficients in the P quantized coefficients.

The target quantized coefficient is any one of the following among the P quantized coefficients: a non-zero quantized coefficient, an even-valued non-zero quantized coefficient, an even-valued quantized coefficient, or an odd-valued quantized coefficient.

The implementation process of the above S606 can refer to the relevant description of the above S402, which will not be repeated herein.

S607, the second quantized coefficient is determined according to the first quantized coefficient and the parity of the second quantized coefficient.

For example, if the second quantized coefficient is an odd number, the value of multiplying the first quantized coefficient by two plus one is determined as the value of the second quantized coefficient.

For another example, if the second quantized coefficient is an odd number, the value of multiplying the first quantized coefficient by two minus one is determined as the value of the second quantized coefficient.

For another example, if the second quantized coefficient is an even number, the value of multiplying the value of the first quantized coefficient by two is determined as the value of the second quantized coefficient.

S608, the quantized coefficients in the current block are determined according to the second quantized coefficient.

According to the above method, the quantized coefficient whose parity is hidden in each region of the current block is determined, and in combination with decoded other quantized coefficients whose parities are not hidden in the current block, the quantized coefficients in the current block are obtained.

S609, the quantized coefficients in the current block are determined according to the decoded information of the current block.

If the current region does not include the quantized coefficient whose parity is hidden, the quantized coefficients decoded from the bitstream are used as the final quantized coefficients in the current block.

S610, the reconstructed value of the current block is obtained according to the quantized coefficients in the current block.

According to the above method, the quantized coefficients of the current block are determined, and the reconstructed value of the current block is determined in the following two methods.

Method 1, the encoding end skips the transform step and directly quantizes the residual value of the current block. Correspondingly, the decoding end de-quantizes the quantized coefficient of the current block to obtain the residual value of the current block. In addition, the intra prediction and/or inter prediction method is used to determine the prediction value of the current block, and the prediction value of the current block is added to the residual value to obtain the reconstructed value of the current block.

Method 2, the encoding end does not skip the transform step, in other words, the encoding end transforms the residual value of the current block to obtain the transform coefficient, and quantizes the transform coefficient. Correspondingly, the decoding end inversely quantizes the quantized coefficient of the current block to obtain the transform coefficient of the current block, inversely transforms the transform coefficient to obtain the residual value of the current block. In addition, the intra prediction and/or inter prediction method is used to determine the prediction value of the current block, and the prediction value of the current block is added to the residual value to obtain the reconstructed value of the current block.

In the embodiment of the disclosure, the preset condition is set for the parity hiding technology. When the current region meets the preset condition, it is determined that the parity of at least one quantized coefficient in the current region is hidden, and then the parity hiding technology provided in the disclosure is used to decode the first quantized coefficient in the current region, thereby improving decoding accuracy.

Exemplarily, the coding syntax corresponding to the embodiment of the disclosure is illustrated in Table 2.

TABLE 2

... ... ...
```
for (c = eob − 1; c >= 0; c−−) {
pos = scan[ c ]
if (c == (eob − 1)) {
   coeff_base_eob                                    S( )
level = coeff_base_eob + 1
```

TABLE 2-continued

```
} else {
   coeff_base                                          S( )
level = coeff_base
}
if (level > NUM_BASE_LEVLS) {
for (idx = 0;
idx < COEFF_BASE_RANGE / (BR_CDF_SIZE - 1);
idx++) {
   coeff_br                                            S( )
level += coeff_br
if (coeff_br < (BR_CDF_SIZE - 1))
break
}
}
Quant[ pos ] = level
}
/* The following part is decoding of the part of the value
greater than 15, and the bold part is the modified part */
for (c = 0; c < eob; c++) {
is_hide = 0
parity = 0
if (c % SUBSIZE == 0) {
num_nz=0
sumAbs = 0
subStart = c
subEnd = c + SUBSIZE
for (si = subStart; c < subEnd; c++) {
pos = scan[si]
if(Quan[ pos ]) {
num_nz++
sumAbs += Quan[ pos ]
}
}
is_hide = num_nz>= HPCTHRESH
parity = sumAbs & 1
}
pos = scan[ c ]
if (Quant[ pos ] != 0 || (is_hide && parity)) {
if (c == 0) {
   dc_sign                                             S( )
sign = dc_sign
} else {
   sign_bit                                            L(1)
sign = sign_bit
}
} else {
sign = 0
}
if (Quant[ pos ] >
(NUM_BASE_LEVLS + COEFF_BASE_RANGE)) {
length = 0
do {
length++
   golomb_length_bit                                   L(1)
} while (!golomb_length_bit)
x = 1
for (i = length - 2; i >= 0; i--) {
   golomb_data_bit                                     L(1)
x = (x << 1) | golomb_data_bit
}
Quant[ pos ] = x + COEFF_BASE_RANGE +
NUM_BASE_LEVLS
if (is_hide) {
Quant[pos] = (Quant[pos] << 1) | parity
}
}
if (pos == 0 && Quant[ pos ] > 0) {
dcCategory = sign ? 1: 2
}
Quant[pos] = Quant[pos] & 0xFFFFF
culLevel += Quant[pos]
if (sign)
Quant[ pos ] = − Quant[ pos ]
}
```

In the above Table 2, SUBSIZE and HPCTHRESH are added, where SUBSIZE is used to identify the size of each region of the current block, and HPCTHRESH is used to identify that the number of non-zero coefficients in the region required to enable the parity hiding technology is greater than a certain threshold.

In the embodiment of the disclosure, when decoding the current region, the decoding end first determines whether the current region meets the preset condition, to determine whether significant beneficial technical effects can be brought when the parity hiding technology provided in the disclosure is used for decoding the current region. When it is determined that the use of the parity hiding technology brings significant beneficial effects, the technical solution of the disclosure is used to decode the current region to improve decoding reliability.

In some embodiments, when decoding the transform block, the current transform block (i.e., the current block) is taken as the current region, that is, one transform block is regarded as a whole region, in other words, the transform block is not partitioned into multiple regions. When the current transform block meets a certain given condition, it is indicated that the parity hiding technology provided in the embodiment of the disclosure is used for the current transform block. In other words, if the current transform block meets the given condition, the parity of the second quantized coefficient is determined according to the P quantized coefficients.

The embodiment of the disclosure does not limit the specific position of the quantized coefficient whose parity is hidden in the current transform block.

In some embodiments, the first quantized coefficient is the last quantized coefficient in the scan order in the current transform block. In other words, the parity of the last coefficient (e.g., the position of the DC coefficient, i.e., the coefficient in the upper left corner of the transform block) in the scan order in the current transform block is hidden.

Exemplarily, if the current transform block is an 8×8-sized transform block as illustrated in FIG. 8, the Zig-Zag scan order is used for the transform block, that is, scanning from the position of index 0 to the position of index 63. The decoding of the coefficients starts from the last non-zero coefficient (e.g., the position of index 21). From the position of index 21 to the position of index 1, if the given condition is met, the coefficient at the position of index 0 is determined to be the coefficient with hidden parity, that is, the coefficient at the position of index 0 is determined to be the first quantized coefficient. In this case, the absolute value of the coefficient (abs_qcoeff) should be obtained by multiplying the decoded value by 2 plus the hidden parity value.

The parity value can be understood as the preset value in the above embodiment. If the quantized coefficient with hidden parity is an odd number, the parity value is 1, and if the quantized coefficient with hidden parity is an even number, the parity value is 0.

The embodiments of the disclosure do not limit the specific contents of the given condition.

In one example, the above given condition include at least one of the following.

Condition 11, the number of non-zero quantized coefficients in the current transform block (i.e., the transform block) is greater than the first value.

Condition 12, the current sequence containing the current transform block allows the parity of the quantized coefficient to be hidden, that is, the parity hiding technology is enabled for the sequence corresponding to the current transform block.

Condition 13, the transform mode used for the current transform block is a non-transform skip (i.e., non-identity transform) mode in both horizontal and vertical directions.

Condition 14, the current transform block is a luma block.

For convenience, herein, identifier 1 is also referred to as Base Range (BR), identifiers 2 to 5 are referred to as Low Range (LR), and the part of the value greater than 15 is referred to as the High Range (HR). In an example, the absolute value (abs_qcoeff) of the coefficient whose parity is hidden can be determined according to the following formula (7).

$$\text{abs\_qcoeff} = (BR + LR + HR) \times 2 + \text{parity} \quad (7)$$

In one example, the value of "parity" depends on the parity of the sum of identifiers 1 to 5 decoded at positions of index 21 to index 1. In other words, if the sum of identifiers 1 to 5 decoded at the positions of index 21 to index 1 is an odd number, it means that the quantized coefficient with hidden parity at the position of index 0 is an odd number, and the corresponding parity value is 1. If the sum of identifiers 1 to 5 decoded at the positions of index 21 to index 1 is an even number, it means that the quantized coefficient with hidden parity at the position of index 0 is an even number, and the corresponding parity value is 0.

For example, "parity" can be determined according to the following formula (8):

$$\text{parity} = \left( \sum_{i=1}^{P} (BR_i + LR_i) \right) \% \ 2 \quad (8)$$

where "%" represents the remainder symbol, $BR_i$ is the value of identifier 1 decoded at the position of index i in the transform block, and $LR_i$ is the value of identifier 2 to identifier 5 decoded at the position of index i in the transform block. In the 8×8-sized transform block illustrated in FIG. 8, P=21.

In some embodiments, the decoding syntax of the transform block is as illustrated in Table 3.

TABLE 3

| | | Notes |
|---|---|---|
| ... | | Decode transform type, last non-zero coefficient position |
| sumAbs1 = 0 | | Initialize the sum in each region |
| num_nz = 0 | | Initializes a counter for non-zero counting for each region |
| for(scanIdx = eob − 1; scanIdx > 1; scanIdx—){ | | Scan from the start point to the penultimate point |
| pos = scan[ scanIdx ] | | Obtain the position of the current scan point in the transform block |
| if (c == (eob − 1)) { | | |
|     coeff_base_eob | S( ) | Decode identifier 1 of the last non-zero coefficient |
| level = coeff_base_eob + 1 | | |
| } else { | | |
|     coeff_base | S( ) | Decode identifier 1 of the last other coefficient |
| level = coeff_base | | |
| } | | |
| if (level > NUM_BASE_LEVLS) { | | |
| for (idx = 0; idx < COEFF_BASE_RANGE | | |
| / (BR_CDF_SIZE − 1); | | |
| idx++) { | | |
|     coeff_br | S( ) | Decode identifiers 2~5 according to the condition |
| level += coeff_br | | |
| if (coeff_br < (BR_CDF_SIZE − 1)) | | |
| break | | |
| } | | |
| } | | |
| Quant[ pos ] = level | | |
| if(level){ | | |
| num_nz++ | | Count the number of non-zero coefficients |
| sumAbs1 += level | | Accumulate the decoded part |
| } | | |
| } | | |
|   isHidePar = num_nz >= SBBTHRESH | | Determine according to the number of non-zero coefficients in the current region whether to hide parity |
|   &&enable_ph | | |
| pos = scan[ scanIdx ] | | Obtain the current position to be decoded |
| if(isHidePar){ | | If the parity is hidden at the current position |
| posBuf[setIdx − 1] = scanIdx | | Record the current scan position corresponding to the coefficient with hidden parity |
|     coeff_base | S( ) | Decode identifier 1 of the coefficient with hidden parity |
| if (level > NUM_BASE_LEVLS) { | | |
| for (idx = 0; idx < | | |
| / (BR_CDF_SIZE − 1); idx++) { | | |
|     coeff_br | S( ) | Decode identifiers 2-5of the coefficient with hidden parity |
| level += coeff_br | | |
| if (coeff_br < (BR_CDF_SIZE − 1)) | | |

TABLE 3-continued

| | | Notes |
|---|---|---|
| break<br>}<br>}<br>}<br>}<br>else{ | | If the parity is not hidden at the current position |
| coeff_base<br>if (level > NUM_BASE_LEVLS) {<br>for (idx = 0; idx < COEFF_BASE_RANGE<br>/ (BR_CDF_SIZE − 1); idx++) { | S( ) | Decode identifier 1of the coefficient |
| coeff_br<br>level += coeff_br<br>if (coeff_br < (BR_CDF_SIZE − 1))<br>break<br>}<br>}<br>} | S( ) | Decode identifiers 2-5of the coefficient |
| Quant[ pos ] = (level << isHidePar) | | If the parity is hidden, multiply the whole by 2 |
| if(isHidePar)<br>Quant[ pos ] += (sumAbs1 & 1) | | If the parity is hidden, add the hidden parity |
| }<br>for (c = 0; c < eob; c++) { | | Decode the remainder and sign of the non-zero coefficient |
| pos = scan[ c ]<br>if (Quant[ pos ] != 0) {<br>if (c == 0) {<br>dc_sign<br>sign = dc_sign | S( ) | |
| } else {<br>sign_bit<br>sign = sign_bit<br>} | L(1) | |
| } else {<br>sign = 0<br>} | | |
| if (Quant[ pos ] >=<br>(NUM_BASE_LEVELS +<br>  COEFF_BASE_RANGE + 1)<br><< (c == posBuf[c / SBBSIZE])) { | | If the current coefficient is not the coefficient with hidden parity, then determine whether to decode the remainder according to whether it is greater than or equal to 15, otherwise, determine whether to decode the remainder according to whether it is greater than or equal to 30. |
| length = 0<br>do {<br>length++<br>golomb_length_bit<br>} while (!golomb_length_bit) | L(1) | |
| x = 1<br>for (i = length − 2; i >= 0; i−−) {<br>golomb_data_bit<br>x = (x << 1) \| golomb_data_bit<br>} | L(1) | |
| Quant[ pos ] += x << (c == posBuf[c / SBBSIZE]) | | Determine whether the remainder is multiplied by 2 according to whether the parity is hidden |
| }<br>if (pos == 0 && Quant[ pos ] > 0) {<br>dcCategory = sign ? 1: 2<br>} | | Decode the sign |
| Quant[pos] = Quant[pos] & 0xFFFFF<br>culLevel += Quant[pos]<br>if (sign)<br>Quant[ pos ] = − Quant[ pos ] | | Assign the sign to the absolute value of the decoded coefficient |
| } | | |

In the above Table 3, SBBSIZE is equivalent to SUBSIZE in the above Table 2, and SBBTHRESH is equivalent to HPCTHRESH in the above Table 2.

The decoding and inverse quantization process involved in the embodiment of the disclosure in Table 3 is a similar representation method of the disclosure in the AV1 standard text. As can be seen, since decoding BR and LR and decoding HR are in two different loops, for a coefficient with hidden parity, the operation process in the above table is to: multiply the (BR+LR) by 2 in the first loop and add the obtained parity value, and then add the possible HR multiplied by 2 in the second loop, to obtain the absolute value of the quantized coefficient. The absolute value of the quantized coefficient is subsequently adjusted according to the sign obtained by decoding, to obtain the quantized coefficient.

In the embodiment, the size (SBBSIZE) of the current region is set to the size of one complete transform block, so that one transform block is used only as one region.

In some embodiments, the first value (SBBTHRESH) can be set to 4, but this value can also be variable, which may be a predefined value or a value parsed from the bitstream.

In some embodiments, the method according to the above conditions 11 to 14 may not be used to determine whether to hide the parity.

For example, if only the above conditions 11, 12, and 13 are met, it means that the parity hiding technology can be applied to both the luma block and the chroma block.

For example, if only the above conditions 11, 12, and 14 are met, it means that the parity hiding technology can be applied to the transform mode in which transform is not performed in one direction.

For example, if only the above conditions 11, 12, and 13 are met, it means that although parity hiding can be applied to both luma and chroma, different SBBSIZE values can be selected as threshold conditions.

Compared to partitioning one transform block into multiple regions, where a coefficient with hidden parity may exist in each region, regarding each transform block as one region has the following advantages.

First, there are more coefficients available for adjustment, and it is easier to select coefficients that will result in lower costs after adjustment.

Second, the context model only needs to be prepared for the coefficient with hidden parity at the DC position.

Third, the computational complexity can be reduced at the encoding end.

In some embodiments, when the transform block is regarded as one region, the number of context models and the number of initial values required are as illustrated in Table 4.

TABLE 4

| Hide parity of coefficient | Number of additional context models | Number of additional initial models values of context probability |
|---|---|---|
| BR of luma component | 5 | 20 |
| LR of luma component | 7 | 28 |
| BR of chroma component | 5 | 20 |
| LR of chroma component | 7 | 28 |

As can be seen from Table 4, an additional context model requires four additional initial probability values. This is because in AVM, the initial value of the context model is related to the quantization parameter used in the current encoding. Depending on the quantization parameter, there are four groups of initial values.

In the embodiment, if the parity hiding technology is only applied to the luma component, the number of additional context models is 5+7=12, and the number of groups of additional initial probability values is 20+28=48. If the parity hiding technology is further applied to the chroma component, the number of context models and the number of groups of initial values will double, which are 5+5+7+7=24 context models and 20+20+28+28=96 groups of initial probability values, respectively.

For each coefficient with hidden parity, the context model selected when encoding and decoding BR and LR being which one of the additional context models is related to the magnitudes of the decoded coefficients around the current coefficient.

As illustrated in FIGS. 9A and 9B, dark gray indicates the position of the current coefficient with hidden parity, and light gray indicates the positions of the decoded coefficients that need to be referenced in selecting the context model. In selecting the context model, the calculation formula of the index is obtained from the following Table 5.

TABLE 5

| Luma or chroma component | Context model index |
|---|---|
| BR | $\min\left(4, \left(\sum_{\Theta} BR\right) + 2\right) >> 1$ |
| LR | $\min\left(6, \left(\left(\sum_{\Phi}(BR + \sum LR)\right)\right) + 1\right) >> 1$ |

In the above Table 5, $\Theta$ and $\Phi$ respectively denotes the coefficient positions around BR and the coefficient positions around LR. In the table, the index value of BR is 0~4, representing a context model at the corresponding index position in the newly added context model in the corresponding color component, and the index value of LR is 0~6, representing a context model at the corresponding index position in the newly added context model in the corresponding color component.

The above describes the video decoding method involved in the embodiment of the disclosure. On this basis, the following describes the video encoding method involved in the disclosure for the encoding end.

Figure 10:
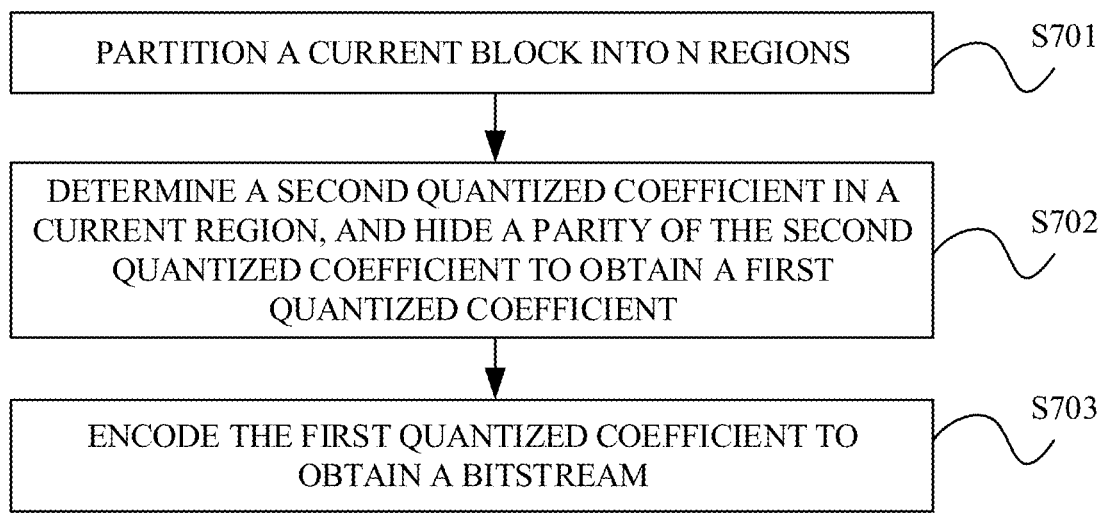
FIG. 10 is a schematic flow chart of a video encoding method provided in embodiments of the disclosure.

FIG. 10 is a schematic flow chart of a video encoding method provided in embodiments of the disclosure. The embodiments of the disclosure may be performed by the encoder illustrated in FIG. 1 and FIG. 2.

As illustrated in FIG. 10, in the embodiment of the disclosure, the method includes the following.

S701, a current block is partitioned into N regions, where N is a positive integer.

In the embodiment of the disclosure, the current block is partitioned into one or more regions, for example, N regions, and N is a positive integer. To reduce the encoding cost, parities of one or more quantized coefficients in the region can be hidden according to the parity related to the quantized coefficients in the same region, for example, according to the parity of the sum of the absolute values of the quantized coefficients in the region, to decrease the quantized coefficient with hidden parity. For example, the value of the second quantized coefficient with parity to be hidden is a1 and a1 is an odd number. A processing method corresponding to an odd number is adopted to process a1, to obtain the first quantized coefficient a2 corresponding to a1, where a2 is smaller than a1. In this way, encoding of a2 takes fewer bits than encoding of a1, and the encoding cost can be reduced.

The region partition method of the current block is not limited in embodiments of the disclosure.

Optionally, at least two regions among the N regions include the same number of quantized coefficients.

Optionally, at least two regions among the N regions include different numbers of quantized coefficients.

In some embodiments, the method of partitioning the current block into the N regions in S701 includes, but is not limited to, the following.

Method 1, according to a scan order, the current block is partitioned into the N regions.

In one example, according to the scan direction, every M non-zero quantized coefficients in the current block are partitioned into one region, to obtain the N regions. Each of the N regions includes M non-zero quantized coefficients. At least one of the N regions includes one or more second quantized coefficients whose parities can be hidden. In the example, if the number of the non-zero quantized coefficients included in the last region is not M, the last region is determined as a separate region, or the last region and the previous region are combined into one region.

In another example, according to the scan direction, every K samples in the current block are partitioned into one region, to obtain N regions. For example, for a transform block of 8×8 size using the inverse ZigZag scan order, when each region is equal in size, i.e., each region contains 16 coefficients, as illustrated in FIG. 6, the current block is partitioned into 4 regions. In the example, if the number of the quantized coefficients included in the last region is not K, the last region is determined as a separate region, or the last region and the previous region are combined into one region.

Method 2, according to a spatial position, the current block is partitioned into the N regions.

In one example, the N regions are sub-blocks of the current block. For example, the current block is evenly partitioned into N sub-blocks. Exemplarily, the size of each sub-block is 4*4.

In another example, multiple samples adjacent in the spatial position are partitioned into one sub-block according to the spatial position relationship of samples in the current block, and each sub-block includes at least one non-zero quantized coefficient.

In the embodiment of the disclosure, the method of partitioning the current block into the N regions may include other methods in addition to the above examples, and the embodiment of the disclosure is not limited thereto.

In some embodiments, a flag may be used to indicate whether the technology of hiding the parity of the quantized coefficient provided in embodiments of the disclosure is allowed for the current block. In some embodiments, the technology of hiding the parity of the quantized coefficient provided in embodiments of the disclosure is also referred to as the parity hiding technology.

Exemplarily, the at least one flag set can correspond to different levels, for indicating whether the parity of the quantized coefficient is allowed to be hidden in the corresponding level.

Optionally, the at least one flag includes at least one of a sequence-level flag, a picture-level flag, a slice-level flag, a unit-level flag, or a block-level flag.

For example, the at least one flag includes the sequence-level flag, for indicating whether the parity of the quantized coefficient is allowed to be hidden for the current sequence.

Optionally, if at least one flag includes the sequence-level flag, the sequence-level flag can be located in a sequence header.

For another example, the at least one flag includes the picture-level flag, and the picture-level flag is used to indicate whether the parity of the quantized coefficient is allowed to be hidden for the current picture.

Optionally, if the at least one flag includes the picture-level flag, the picture-level flag can be located in a picture header.

For another example, the at least one flag includes the slice-level flag, for indicating whether the parity of the quantized coefficient is allowed to be hidden for the current slice.

Optionally, if at least one flag includes the slice-level flag, the slice-level flag can be located in a slice header.

For another example, the at least one flag includes a unit-level flag, for indicating whether the parity of the quantized coefficient is allowed to be hidden for the current CTU.

For another example, the at least one flag includes the block-level flag, for indicating whether the parity of the quantized coefficient is allowed to be hidden for the current block.

In this way, the encoding end first obtains the at least one flag, and determines whether the parity of the quantized coefficient is allowed to be hidden for the current block according to the at least one flag. If it is determined according to the at least one flag that the parity of the quantized coefficient is not allowed to be hidden for the current block, the method of the embodiment of the disclosure is skipped. If it is determined according to the at least one flag that the parity hiding technology provided in the embodiment of the disclosure is allowed to be used, the method of the embodiment of the disclosure is executed.

In some embodiments, the parity hiding technology of the quantized coefficient provided in the embodiments of the disclosure is mutually exclusive to the target transform mode, where target transform mode includes a secondary transform or multiple transforms, etc. In this case, when the encoding end determines to transform the current block in the target transform mode, the encoding end skips the technical solution provided in the embodiment of the disclosure.

In some embodiments, the current transform block (i.e., the current block) is partitioned into one region.

In some embodiments, when the current block is partitioned into one region, the second quantized coefficient is the last quantized coefficient in the scan order in the current transform block.

In some embodiments, if the current block meets the given condition, the current block is partitioned into one region.

Exemplarily, the given condition includes at least one of the following.

The number of non-zero quantized coefficients in the current block is greater than a first value.

A current sequence containing the current block allows a parity of a quantized coefficient to be hidden.

A transform mode used for the current block is a non-transform skip (i.e., non-identity transform) mode in both horizontal and vertical directions.

The current block is a luma block.

S702, a second quantized coefficient in a current region is determined, and a parity of the second quantized coefficient is hidden to obtain a first quantized coefficient.

The current region is a region among the N regions that includes at least one non-zero quantized coefficient.

In the embodiment of the disclosure, to reduce the encoding cost, the parity of the second quantized coefficient is hidden to obtain the first quantized coefficient, and the first quantized coefficient, rather than the second quantized coefficient, is encoded into the bitstream. Since the first quantized coefficient is generally smaller than the second quantized coefficient, the number of bits required for encoding the first quantized coefficient can be reduced compared to encoding the second quantized coefficient, thereby reducing the encoding cost.

In the embodiment of the disclosure, the method of hiding the parity of the second quantized coefficient to obtain the first quantized coefficient is not limited.

In some embodiments, according to the parity of the second quantized coefficient, different methods may be selected to determine the first quantized coefficient, as illustrated in case 1 and case 2.

Case 1, if the second quantized coefficient is an odd number, the third calculation method is used to make calculation on the second quantized coefficient to obtain the first quantized coefficient.

The specific form of the third calculation method mentioned above in the embodiment of the disclosure is not limited.

Method 1, the third calculation method includes: the first quantized coefficient being equal to the value of the second quantized coefficient plus one and then divided by two.

Exemplarily, the third calculation method is illustrated in formula (9):

$$val = (A + 1)/2 \quad (9)$$

where A is the second quantized coefficient, and val is the first quantized coefficient.

In method 1, if the second quantized coefficient is an odd number, the parity of the second quantized coefficient is hidden according to the third calculation method illustrated in the above formula (9), to obtain the first quantized coefficient. For example, if the value of the second quantized coefficient is 9, then according to the above formula (9), the value of the first quantized coefficient is determined to be 5. Compared with encoding the value 9, encoding the value 5 can reduce the number of bits and reduce the encoding cost.

It should be noted that the above formula (9) is only an example of the third calculation method involved in the embodiment of the disclosure. The third calculation method of the embodiment of the disclosure includes but is not limited to the above formula (9).

Case 2, if the second quantized coefficient is an even number, the fourth calculation method is used to make calculation on the second quantized coefficient to obtain the first quantized coefficient.

The specific form of the fourth calculation method described above in the embodiment of the disclosure is not limited.

Exemplarily, the fourth calculation method includes: the first quantized coefficient being equal to the value of the second quantized coefficient divided by two.

For example, the fourth calculation method is illustrated in formula (10).

$$val = A/2 \quad (10)$$

In case 2, if the second quantized coefficient is an even number, the parity of the second quantized coefficient is hidden according to the fourth calculation method illustrated in the above formula (10), to obtain the first quantized coefficient. For example, if the value of the second quantized coefficient is 10, then according to the above formula (10), the value of the first quantized coefficient is determined to be 5. Compared with encoding the value 10, encoding the value 5 can reduce the number of bits and reduce the encoding cost.

It should be noted that the above formula (10) is only an example of the fourth calculation method involved in the embodiment of the disclosure. The fourth calculation method of the embodiment of the disclosure includes but is not limited to the above formula (10).

In some embodiments, the encoding end may use a preset calculation method to make calculation on the second quantized coefficient according to the parity of the second quantized coefficient, to obtain the first quantized coefficient.

The disclosure does not impose any restriction on the specific value in the preset calculation method. For example, the preset calculation method is: dividing the value of the second quantized coefficient by a positive integer greater than 1.

Exemplarily, the preset calculation method includes: dividing the value of the second quantized coefficient by two and then rounding, where rounding can be understood as a quotient operation, for example, the value of the second quantized coefficient is 7, and 7 divided by 2 is 3.

For example, the encoding end determines the first quantized coefficient by using the following formula (11):

$$Q_b = Q/2 \quad (11)$$

where Q represents the second quantized coefficient, $Q_b$ represents the first quantized coefficient, and "//" represents a rounding operation.

As can be seen from the above formula (11), subjected to the above operation, the parity of the second quantized coefficient is hidden to obtain the first quantized coefficient. The absolute value of the first quantized coefficient is smaller than the absolute value of the second quantized coefficient, and thus and the number of bits required for encoding the first quantized coefficient is small, thereby reducing the encoding cost. For example, when the second quantized coefficient is 10, only the value 5 needs to be encoded. For another example, when the second quantized coefficient is 21, only the value 10 needs to be encoded, which can greatly reduce the number of bits required for encoding.

S703, the first quantized coefficient is encoded to obtain a bitstream.

According to the above method, after the first quantized coefficient in the current region is determined, the first quantized coefficient is encoded to obtain the bitstream.

In the embodiment of the disclosure, the parity of the second quantized coefficient is indicated by P quantized coefficients in the current region.

For example, a binary feature (0 or 1) of the P quantized coefficients in the current region is used to indicate the parity of the second quantized coefficient in the current region.

In some embodiments, the parity of the second quantized coefficient is indicated by the parity corresponding to the P quantized coefficients in the current region.

In one example, the P quantized coefficients are all quantized coefficients in the current region.

In another example, the P quantized coefficients are part of the quantized coefficients in the current region.

Optionally, the P quantized coefficients do not include the first quantized coefficient in the current region.

Exemplarily, the parity corresponding to the P quantized coefficients may be the parity of the smallest quantized coefficient among the P quantized coefficients, the largest quantized coefficient among the P quantized coefficients, the sum of the absolute values of the P quantized coefficients, the number of target quantized coefficients among the P quantized coefficients, and the like.

In the embodiment of the disclosure, the parity corresponding to the P quantized coefficients in the current region is used to indicate the parity of the second quantized coefficient. For example, the parity corresponding to the P quantized coefficients being an odd number indicates that the current second quantized coefficient is an odd number, and the parity corresponding to the P quantized coefficients being an even number indicates that the current second quantized coefficient is an even number.

In some embodiments, if the parity corresponding to the P quantized coefficients is inconsistent with the parity of the second quantized coefficient, the method of the embodiment of the disclosure further includes the following step 1.

Step 1, the P quantized coefficients are adjusted so that the parity corresponding to the P quantized coefficients is consistent with the parity of the second quantized coefficient.

Case 1, if the parity of the second quantized coefficient is indicated by the parity of the sum of the first absolute values of the P quantized coefficients, step 1 is achieved as follows. The values of the P quantized coefficients are adjusted so that the parity of the sum of the first absolute values of the P quantized coefficients is consistent with the parity of the second quantized coefficient.

The first absolute values of the quantized coefficients are part or all of the absolute values of the quantized coefficients. For example, the first absolute values of the quantized coefficients are a part of absolute values less than 15 of the quantized coefficients.

Case 1 includes the following two examples.

Example 1, if the second quantized coefficient is an odd number and the sum of the first absolute values of the P quantized coefficients is an even number, the values of the P quantized coefficients are adjusted so that the sum of the first absolute values of the adjusted P quantized coefficients is an odd number.

For example, if the second quantized coefficient is an odd number and the sum of the first absolute values of the P quantized coefficients is an even number, the smallest quantized coefficient among the P quantized coefficients is increased or decreased by 1, to modify the sum of the first absolute values of the P quantized coefficients to an odd number.

Example 2, if the second quantized coefficient is an even number and the sum of the first absolute values of the P quantized coefficients is an odd number, the values of the P quantized coefficients are adjusted so that the sum of the first absolute values of the adjusted P quantized coefficients is an even number.

For example, if the second quantized coefficient is an even number and the sum of the first absolute values of the P quantized coefficients is an odd number, the smallest quantized coefficient among the P quantized coefficients is increased or decreased by 1, to modify the sum of the first absolute values of the P quantized coefficients to an even number.

Case 2, if the parity of the second quantized coefficient is indicated by the parity of the number of the target quantized coefficients in the P quantized coefficients, step 1 is achieved as follows. The values of the P quantized coefficients are adjusted so that the parity of the number of the target quantized coefficients in the P quantized coefficients is consistent with the parity of the second quantized coefficient.

The above example 2 includes at least the following two examples.

Example 1, if the second quantized coefficient is an odd number, and the number of the target quantized coefficients in the P quantized coefficients is an even number, the values of the P quantized coefficients are adjusted so that the number of the target quantized coefficients in the adjusted P quantized coefficients is an odd number.

Example 2, if the second quantized coefficient is an even number, and the number of the target quantized coefficients in the P quantized coefficients is an odd number, the values of the P quantized coefficients are adjusted so that the number of the target quantized coefficients in the adjusted P quantized coefficients is an even number.

The target quantized coefficient is any one of the following among the P quantized coefficients: a non-zero quantized coefficient, an even-valued non-zero quantized coefficient, an even-valued quantized coefficient, or an odd-valued quantized coefficient.

In one example, if the target quantized coefficient is a non-zero quantized coefficient among the P quantized coefficients, the encoding end modifies at least one coefficient among the P quantized coefficients. For example, if the second quantized coefficient is an odd number, and the number of non-zero quantized coefficients among the P quantized coefficients is an even number, then a quantized coefficient with a value of 0 among the P quantized coefficients may be adjusted to 1, or the value of the smallest quantized coefficient among the P quantized coefficients may be adjusted to 0, so that the number of non-zero quantized coefficients among the P quantized coefficients is an odd number.

For another example, if the second quantized coefficient is an even number, and the number of non-zero quantized coefficients in the P quantized coefficients is an odd number, then a quantized coefficient with a value of 0 in the P quantized coefficients can be adjusted to 1, or the value of the smallest non-zero quantized coefficient in the P quantized coefficients can be adjusted to 0, so that the number of non-zero quantized coefficients in the P quantized coefficients is an even number.

In another example, if the target quantized coefficient is a non-zero quantized coefficient with an even value among the P quantized coefficients, the encoding end modifies at least one coefficient among the P quantized coefficients. For example, if the second quantized coefficient is an odd number, and the number of non-zero quantized coefficients with even values among the P quantized coefficients is an even number, then the quantized coefficient with a value of 0 among the P quantized coefficients can be adjusted to 2, or the value of the smallest non-zero quantized coefficient among the P quantized coefficients may be increased by 1 or decreased by 1, so that the number of non-zero quantized coefficients with even values among the P quantized coefficients is an odd number.

For another example, if the second quantized coefficient is an even number, and the number of non-zero quantized coefficients with even values among the P quantized coefficients is an odd number, then a quantized coefficient with a value of zero among the P quantized coefficients can be adjusted to 2, or the value of the smallest non-zero quantized coefficient among the P quantized coefficients may be increased by 1 or decreased by 1, so that the number of non-zero quantized coefficients among the P quantized coefficients is an even number. The encoding end adjusts at least one coefficient among the P quantized coefficients by using an adjustment method with the lowest rate-distortion cost.

In another example, if the target quantized coefficient is a quantized coefficient with an even value among the P quantized coefficients, the encoding end modifies at least one coefficient among the P quantized coefficients. For example, if the second quantized coefficient is an odd number, and the number of quantized coefficients with even values among the P quantized coefficients is an even number, then a quantized coefficient with a value of 0 among the P quantized coefficients may be adjusted to 1, or the smallest non-zero quantized coefficient among the P quantized coefficients may be adjusted to 0, so that the number of quantized coefficients with even values among the P quantized coefficients is an odd number.

For another example, if the second quantized coefficient is an even number, and the number of quantized coefficients with even values among the P quantized coefficients is an odd number, then a quantized coefficient with a value of 0 among the P quantized coefficients can be adjusted to 1, or the smallest non-zero quantized coefficient among the P quantized coefficients can be adjusted to 0, so that the number of quantized coefficients with even values among the P quantized coefficients is an even number.

In another example, if the target quantized coefficient is a quantized coefficient with an odd value among the P quantized coefficients, the encoding end modifies at least one coefficient among the P quantized coefficients. For example, if the second quantized coefficient is an odd number, and the number of quantized coefficients with odd values among the P quantized coefficients is an even number, then a quantized coefficient with a value of 0 among the P quantized coefficients may be adjusted to 1, or the smallest non-zero quantized coefficient among the P quantized coefficients may be adjusted to 0 or added by 1 or subtracted by 1, so that the number of quantized coefficients with odd values among the P quantized coefficients is an odd number.

For another example, if the second quantized coefficient is an even number, and the number of quantized coefficients with odd values among the P quantized coefficients is an odd number, then a quantized coefficient with a value of 0 among the P quantized coefficients can be adjusted to 1, or the smallest non-zero quantized coefficient among the P quantized coefficients can be adjusted to 0 or added by 1 or subtracted by 1, so that the number of quantized coefficients with odd values among the P quantized coefficients is an even number.

Furthermore, the parity hiding technology provided in the disclosure is implemented on the AVM reference software, the size of the region used is set to 16, and the threshold value of the number of non-zero coefficients for enabling parity hiding is 4. When the parity hiding technology of the disclosure is enabled for the current region, if the sum of the absolute values that are less than or equal to 15 of the non-zero coefficients in the current region is an odd number, it means that the last coefficient (i.e., the second quantized coefficient) in the scan order in the region is an odd number; if it is an even number, it means that the last coefficient (i.e., the second quantized coefficient) in the scan order in the region is an even number. The specific test results are illustrated in Table 6.

TABLE 6

| | PSNR | | | |
|---|---|---|---|---|
| | Y | U | V | YUV |
| Class A1_4K | −0.18% | −0.82% | −0.84% | −0.26% |
| Class A1_2K | −0.15% | −0.87% | −0.90% | −0.22% |
| Class A3_720p | −0.11% | −0.82% | −0.81% | −0.17% |
| Class A4_360p | −0.12% | −0.88% | −0.98% | −0.18% |
| Class A5_270p | −0.03% | −0.55% | −0.43% | −0.06% |
| Class B1_SYN | −0.03% | −0.50% | −0.57% | −0.03% |
| Overall Performance | −0.10% | −0.76% | −0.79% | −0.17% |

In Table 6, the PSNR is the peak signal-to-noise ratio, which represents the ratio of the maximum possible signal power to the destructive noise power that affects its representation accuracy. Since many signals have very wide dynamic ranges, the peak signal-to-noise ratio is generally expressed in logarithmic decibel units. In video coding, the PSNR is used to evaluate the quality of a compressed picture compared to the original picture. The higher the PSNR, the smaller the distortion after compression.

As can be seen from Table 6, under the AVM general test conditions, by using the parity hiding technology of the embodiment of the disclosure, the all intra coding performance on three components (YUV components) is improved by 0.10%, 0.75%, and 0.79%, respectively.

In some embodiments, the transform block is taken as a region, the parity hiding technology provided in the disclosure is implemented on the AVM reference software, and each transform block can only hide the parity of the coefficient at the DC position. The parity hiding technology is used when the above conditions 11, 12, 13 and 14 are met. When SBBSIZE is set to 4, the results of all intra, random access, and low delay configurations measured under the AVM general test conditions CTC v3 and the reference software research-v3.0.0 are illustrated in Tables 7, 8, and 9.

TABLE 7

| | all intra | | | | |
|---|---|---|---|---|---|
| | PSNR | | | | |
| | Y | U | V | YUV | wAverage |
| Class A1_4K | −0.28% | −0.96% | −0.89% | −0.36% | −0.34% |
| Class A1_2K | −0.30% | −0.97% | −1.00% | −0.37% | −0.36% |
| Class A3_720p | −0.27% | −0.72% | −0.92% | −0.32% | −0.31% |
| Class A4_360p | −0.32% | −0.56% | −0.73% | −0.34% | −0.34% |
| Class A5_270p | −0.31% | −0.38% | −1.10% | −0.36% | −0.35% |
| Class B1_SYN | −0.25% | −0.71% | −0.61% | −0.29% | −0.28% |
| Class B2_SCC | −0.10% | −0.21% | −0.06% | −0.10% | −0.10% |
| Overall Mandatory w/o_B2 | −0.29% | −0.81% | −0.89% | −0.34% | −0.33% |
| Overall Mandatory w/_B2 | −0.26% | −0.71% | −0.75% | −0.30% | −0.30% |

TABLE 8

| | random access | | | | |
|---|---|---|---|---|---|
| | PSNR | | | | |
| | Y | U | V | YUV | wAverage |
| Class A1_4K | −0.37% | −0.67% | −0.77% | −0.41% | −0.40% |
| Class A1_2K | −0.39% | −0.59% | −0.65% | −0.41% | −0.41% |
| Class A3_720p | −0.31% | −0.40% | −0.38% | −0.31% | −0.31% |
| Class A4_360p | −0.47% | −0.86% | −0.60% | −0.51% | −0.49% |
| Class A5_270p | −0.28% | −1.80% | −1.40% | −0.40% | −0.38% |

TABLE 8-continued random access

| | PSNR | | | | |
|---|---|---|---|---|---|
| | Y | U | V | YUV | wAverage |
| Class B1_SYN | −0.28% | −0.94% | −0.73% | −0.33% | −0.32% |
| Class B2_SCC | −0.03% | −0.23% | −0.47% | −0.07% | −0.06% |
| Overall Mandatory w/o_B2 | −0.36% | −0.75% | −0.69% | −0.39% | −0.39% |
| Overall Mandatory w/_B2 | −0.31% | −0.66% | −0.66% | −0.34% | −0.33% |

TABLE 9 low delay

| | PSNR | | | | |
|---|---|---|---|---|---|
| | Y | U | V | YUV | wAverage |
| Class A1_4K | | | | | |
| Class A1_2K | −0.32% | −0.86% | −0.43% | −0.35% | −0.35% |
| Class A3_720p | −0.20% | −0.60% | −0.49% | −0.23% | −0.23% |
| Class A4_360p | −0.17% | −0.81% | −0.16% | −0.19% | −0.18% |
| Class A5_270p | −0.03% | −0.28% | −0.54% | −0.00% | −0.01% |
| Class B1_SYN | −0.24% | −0.50% | −0.58% | −0.26% | −0.26% |
| Class B2_SCC | −0.04% | −0.29% | −0.19% | −0.06% | −0.05% |
| Overall Mandatory w/o_B2 | −0.24% | −0.69% | −0.32% | −0.27% | −0.27% |
| Overall Mandatory w/_B2 | −0.21% | −0.62% | −0.30% | −0.23% | −0.23% |

As can be seen from tables 7 to 9, when the transform block is taken as one region and the parity hiding technology is enabled, the performance is significantly improved when tests are performed under the all intra, random access, and low delay configurations respectively.

In another example, the transform block is taken as one region, and the parity hiding technology provided in the disclosure is implemented on the AVM reference software. Only the parity of the coefficient at the DC position can be hidden in each transform block. When the above conditions 11, 12 and 13 are met, the parity hiding technology is used. When SBBSIZE is set to 4, the results of the all intra configuration measured under the AVM general test condition CTC v3 and the reference software research-v3.0.0 are illustrated in Table 10.

TABLE 10 all intra

| | PSNR | | | | |
|---|---|---|---|---|---|
| | Y | U | V | YUV | wAverage |
| Class A1_4K | −0.33% | −0.80% | −0.81% | −0.39% | −0.37% |
| Class A1_2K | −0.34% | −0.83% | −0.85% | −0.39% | −0.38% |
| Class A3_720p | −0.30% | −0.64% | −0.84% | −0.34% | −0.34% |
| Class A4_360p | −0.33% | −0.48% | −0.66% | −0.35% | −0.35% |
| Class A5_270p | −0.35% | −0.50% | −0.87% | −0.38% | −0.37% |
| Class B1_SYN | −0.29% | −0.69% | −0.54% | −0.31% | −0.31% |
| Class B2_SCC | −0.17% | −0.25% | −0.35% | −0.15% | −0.15% |
| Overall Mandatory w/o_B2 | −0.32% | −0.72% | −0.77% | −0.37% | −0.36% |
| Overall Mandatory w/_B2 | −0.30% | −0.64% | −0.69% | −0.33% | −0.32% |

As can be seen from Table 10, for the luma transform block or the chroma transform block subjected to non-identity transform, when the parity hiding technology is enabled and tests are performed under the all intra configuration, the performance is significantly improved.

In the video encoding method provided in the embodiment of the disclosure, the encoding end partitions the current block into the N regions, determines the second quantized coefficient in the current region, and hides the parity of the second quantized coefficient to obtain the first quantized coefficient. Then, the encoding end encodes the first quantized coefficient to obtain the bitstream, and the parity of the second quantized coefficient is indicated by the P quantized coefficients in the current region. That is, in the embodiment of the disclosure, the encoding end hides the parity of the second quantized coefficient in the current region to obtain the first quantized coefficient. Since the absolute value of the first quantized coefficient is less than that of the second quantized coefficient, compared to encoding the second quantized coefficient, encoding the first quantized coefficient can reduce the number of encoding bits, thereby reducing the encoding cost. Further, the parity of the second quantized coefficient is indicated by the P quantized coefficients in the current region, so that the decoding end determines the parity of the second quantized coefficient according to the P quantized coefficients in the current region, and then accurately reconstructs the second quantized coefficient according to the parity of the second quantized coefficient and the first quantized coefficient.

Based on the embodiment illustrated in FIG. 7 above, the video encoding method provided in the embodiment of the disclosure is further described below in conjunction with FIG. 11.

Figure 11:
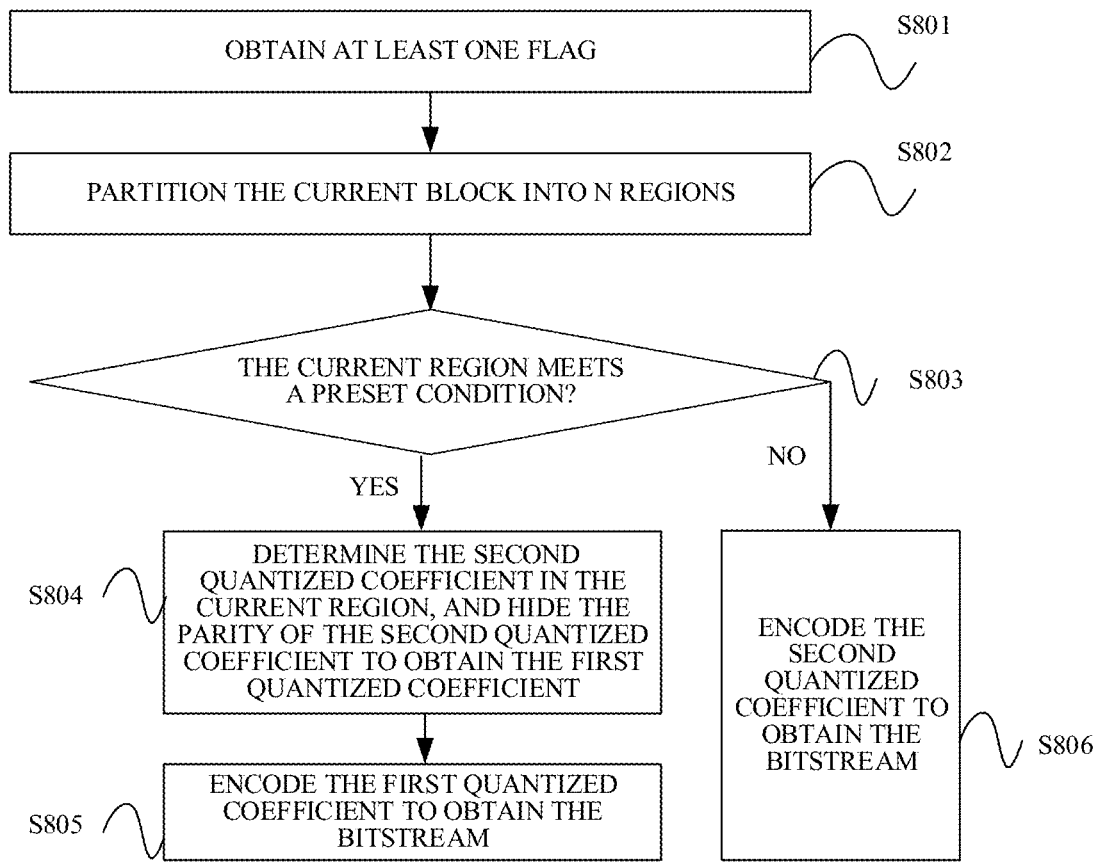
FIG. 11 is a schematic flow chart of a video encoding method provided in an embodiment of the disclosure.

FIG. 11 is a schematic flow chart of a video encoding method provided in embodiments of the disclosure. As illustrated in FIG. 11, the method of the embodiment of the disclosure includes the following.

S801, at least one flag is obtained.

The at least one flag indicates whether the parity of the quantized coefficient is allowed to be hidden.

Optionally, the at least one flag includes at least one of a sequence-level flag, a picture-level flag, a slice-level flag, a unit-level flag, or a block-level flag.

If it is determined according to the at least one flag that the parity of the quantized coefficient of the current block is allowed to be hidden, the following S802 is performed.

If it is determined according to the at least one flag that the parity of the quantized coefficient of the current block is not allowed to be hidden, the following S806 is performed.

S802, the current block is partitioned into N regions.

The embodiment of the disclosure does not limit the region partition method of the current block. For example, the current block is partitioned into the N regions according to the scan order, or the current block is partitioned into the N regions according to the spatial positions of the samples in the current block.

The N regions may be the same or different, which is not limited in the embodiment of the disclosure.

The implementation process of the above S802 can refer to the relevant description of the above S701, which will not be repeated herein.

S803, determine whether the current region meets a preset condition.

In the embodiment of the disclosure, the parity hiding technology provided in the disclosure is limited. Specifically, if the current region meets the preset condition, it means that significant beneficial effects can be achieved by applying the parity hiding technology provided in the embodiment of the disclosure to the current region. In this case, the following S804 is executed.

If the current region does not meet the preset condition, it means that no significant beneficial effects can be achieved by applying the parity hiding technology provided in the embodiment of the disclosure to the current region. In this case, the following S806 is executed.

The embodiments of the disclosure do not limit the specific contents of the preset condition, which can be set according to actual needs.

In a possible implementation, the preset condition includes at least one of the following conditions.

Condition 1, the number of non-zero quantized coefficients in the current region is greater than a first value.

Condition 2, in the current region, a distance between a first non-zero quantized coefficient and a last non-zero quantized coefficient in a decoding scan order is greater than a second value.

Condition 3, in the current region, a distance between the first non-zero quantized coefficient and a last quantized coefficient in the decoding scan order is greater than a third value.

Condition 4, in the current region, a sum of absolute values of the non-zero quantized coefficients is greater than a fourth value.

In some embodiments, the above four conditions can also be combined with each other to form new constraints.

The embodiment of the disclosure does not limit the specific values of the first to fourth values, as long as the first to fourth values are all positive integers.

In one example, at least one of the first value, the second value, the third value, or the fourth value is a fixed value.

In another example, at least one of the first value, the second value, the third value and the fourth value is a non-fixed value, that is, a value determined by the encoding end according to the current encoding information.

In some embodiments, if at least one of the first value, the second value, the third value, or the fourth value is a non-fixed value, the encoding end signals the non-fixed value into the bitstream, and the decoding end parses the non-fixed value from the bitstream.

S804, the second quantized coefficient in the current region is determined, and the parity of the second quantized coefficient is hidden to obtain the first quantized coefficient.

S805, the first quantized coefficient is encoded to obtain the bitstream.

The above S804 and S805 can refer to the description of the above S702 and S703, and will not be repeated herein.

S806, the second quantized coefficient is encoded to obtain the bitstream.

In the embodiment of the disclosure, when encoding the current region, the encoding end first determines whether the current region meets the preset condition, to determine whether significant beneficial technical effects can be brought by adopting the parity hiding technology provided in the disclosure for encoding the current region. When it is determined that the use of the parity hiding technology has significant beneficial effects, the technical solution of the disclosure is used to encode the current region, to improve the coding reliability.

It should be understood that, FIG. 5 to FIG. 11 are merely examples of the disclosure, and should not be construed as limitations on the disclosure.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all fall within the protection scope of the disclosure. For example, various technical features described in the foregoing implementations may be combined in any suitable manner without contradiction, and to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It should also be understood that, in various method embodiments of the disclosure, the magnitude of a sequence number of each of the foregoing processes does not mean an execution order, and an execution order of each process should be determined according to a function and an internal logic of the process, which shall not constitute any limitation on an implementation process of embodiments of the disclosure. In addition, the term "and/or" herein only describes an association between associated objects, which means that there can be three relationships. Specifically, A and/or B can mean A alone, both A and B exist, and B alone. Besides, the character "/" herein generally indicates that the associated objects are in an "or" relationship.

The method embodiments of the disclosure are described in detail above with reference to FIG. 5 to FIG. 11, and the device embodiments of the disclosure are described in detail below with reference to FIG. 12 to FIG. 15.

Figure 12:
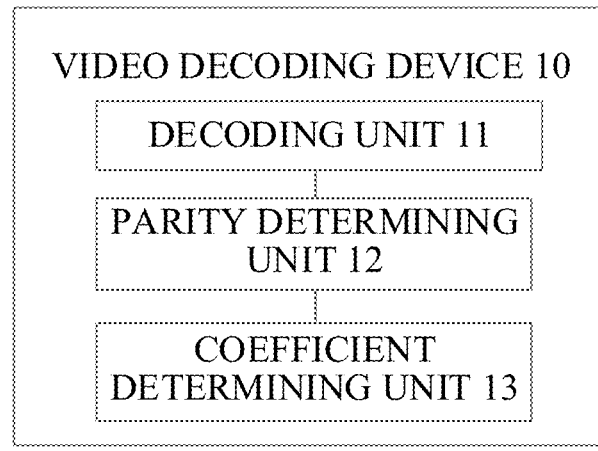
FIG. 12 is a schematic block diagram of a video decoding device provided in embodiments of the disclosure.

FIG. 12 is a schematic block diagram of a video decoding device provided in embodiments of the disclosure.

As illustrated in FIG. 12, the video decoding device 10 includes a decoding unit 11, a parity determining unit 12, and a coefficient determining unit 13.

The decoding unit 11 is configured to decode a bitstream, to obtain P quantized coefficients and a first quantized coefficient in a current region, where the current region is a region in a current block including at least one non-zero quantized coefficient, the first quantized coefficient is obtained by performing parity hiding on a second quantized coefficient in the current region, and P is a positive integer. The parity determining unit 12 is configured to determine a parity of the second quantized coefficient according to the P quantized coefficients. The coefficient determining unit 13 is configured to determine the second quantized coefficient having the parity according to the first quantized coefficient and the parity of the second quantized coefficient.

In some embodiments, the parity determining unit 12 is configured to determine the parity of the second quantized coefficient according to a parity corresponding to the P quantized coefficients.

In some embodiments, the parity determining unit 12 is configured to determine the parity of the second quantized coefficient according to a parity of a sum of first absolute values of the P quantized coefficients, where the first absolute values are part or all of absolute values of the P quantized coefficients.

In some embodiments, the parity determining unit 12 is configured to: determine that the second quantized coefficient is an odd number in response to the sum of the first absolute values of the P quantized coefficients being an odd number; and determine that the second quantized coefficient is an even number in response to the sum of the first absolute values of the P quantized coefficients being an even number.

In some embodiments, the parity determining unit 12 is configured to: determine target quantized coefficients among the P quantized coefficients; and determine the parity of the second quantized coefficient according to a parity of the number of the target quantized coefficients among the P quantized coefficients.

In some embodiments, the parity determining unit 12 is configured to: determine that the second quantized coefficient is an odd number in response to the number of the target quantized coefficients among the P quantized coefficients being an odd number; and determine that the second quantized coefficient is an even number in response to the number of the target quantized coefficients among the P quantized coefficients being an even number.

In some embodiments, the target quantized coefficient is any one of the following among the P quantized coefficients: a non-zero quantized coefficient, a non-zero quantized coefficient having an even value, a quantized coefficient having an even value, or a quantized coefficient having an odd value.

In some embodiments, the coefficient determining unit 13 is configured to: make calculation on the first quantized coefficient with a preset calculation method, to obtain a calculation result; and obtain the second quantized coefficient according to the parity of the second quantized coefficient and the calculation result.

In some embodiments, the preset calculation method includes multiplying a value of the first quantized coefficient by two.

In some embodiments, the coefficient determining unit 13 is configured to determine a sum of the calculation result and a preset value to be the second quantized coefficient, where the preset value is 1 in response to the second quantized coefficient being an odd number and the preset value is 0 in response to the second quantized coefficient being an even number.

In some embodiments, the parity determining unit 12 is configured to determine the parity of the second quantized coefficient according to the P quantized coefficients in response to the current region satisfying a preset condition.

In some embodiments, the preset condition includes at least one of: the number of non-zero quantized coefficients in the current region being greater than a first value; in the current region, a distance between a first non-zero quantized coefficient and a last non-zero quantized coefficient in a decoding scan order being greater than a second value; in the current region, a distance between the first non-zero quantized coefficient and a last quantized coefficient in the decoding scan order being greater than a third value; or in the current region, a sum of absolute values of the non-zero quantized coefficients being greater than a fourth value.

In some embodiments, at least one of the first value, the second value, the third value, or the fourth value is a fixed value.

In some embodiments, at least one of the first value, the second value, the third value, or the fourth value is a non-fixed value.

In some embodiments, the decoding unit 11 is further configured to: decode the bitstream to obtain the non-fixed value when at least one of the first value, the second value, the third value, or the fourth value is a non-fixed value.

In some embodiments, the decoding unit 11 is further configured to: skip determining the parity of the second quantized coefficient according to the P quantized coefficients, in response to the current block being transformed in a target transform mode.

In some embodiments, the target transform mode includes a secondary transform or multiple transforms.

In some embodiments, the first quantized coefficient is a non-zero quantized coefficient at the K-th position in a scan order in the current region, and the K is less than or equal to the number of non-zero quantized coefficients in the current region.

In some embodiments, the decoding unit 11 is further configured to: decode the bitstream to obtain decoded information of the current block; partition the current block into N regions, where N is a positive integer; and obtain the P quantized coefficients and the first quantized coefficient from the decoded information of the current block.

In some embodiments, the decoding unit 11 is further configured to partition the current block into the N regions according to a scan order.

In some embodiments, the decoding unit 11 is configured to partition the current block into the N regions according to a spatial position.

In some embodiments, at least two of the N regions include the same number of quantized coefficients.

In some embodiments, at least two of the N regions include different numbers of quantized coefficients.

In some embodiments, the decoding unit 11 is further configured to: decode the bitstream to obtain at least one flag, where the at least one flag indicates whether a parity of a quantized coefficient is allowed to be hidden; and partition the current block into the N regions, in response to determining according to the at least one flag that a parity of at least one quantized coefficient in the current block is allowed to be hidden.

In some embodiments, the at least one flag includes at least one of: a sequence-level flag, a picture-level flag, a slice-level flag, a unit-level flag, or a block-level flag.

In some embodiments, the current region is the current block.

In some embodiments, the first quantized coefficient is a last quantized coefficient in a scan order in the current block.

In some embodiments, the parity determining unit 12 is configured to: determine the parity of the second quantized coefficient according to the P quantized coefficients, in response to the current block satisfying a given condition.

In some embodiments, the given condition includes at least one of: the number of non-zero quantized coefficients in the current block being greater than a first value; a current sequence containing the current block allowing a parity of a quantized coefficient to be hidden; a transform mode used for the current block being a non-transform skip mode in both horizontal and vertical directions; or the current block being a luma block.

It should be understood that, the apparatus embodiments and the method embodiments may correspond to each other, and for similar elaborations, reference can be made to the method embodiments, which will not be elaborated again herein to avoid redundancy. Specifically, the video decoding device 10 illustrated in FIG. 12 may perform the method in the embodiment of the disclosure, and the foregoing and other operations and/or functions of various units in the video decoding device 10 are respectively intended to implement corresponding processes in the foregoing methods, which are not described again herein for brevity.

Figure 13:
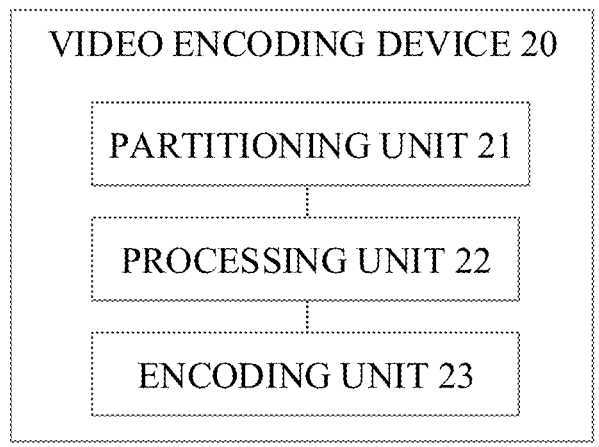
FIG. 13 is a schematic block diagram of a video encoding device provided in embodiments of the disclosure.

FIG. 13 is a schematic block diagram of a video encoding device provided in embodiments of the disclosure.

As illustrated in FIG. 13, the video encoding device 20 includes a partitioning unit 21, a processing unit 22, and an encoding unit 23.

The partitioning unit 21 is configured to partition a current block into N regions, where N is a positive integer. The processing unit 22 is configured to determine a second quantized coefficient in a current region and hide a parity of the second quantized coefficient to obtain a first quantized coefficient, where the current region is a region among the N regions including at least one non-zero quantized coefficient. The encoding unit 23 is configured to encode the first quantized coefficient to obtain a bitstream, where the parity of the second quantized coefficient is indicated by P quantized coefficients in the current region and P is a positive integer.

In some embodiments, the parity of the second quantized coefficient is indicated by a parity corresponding to the P quantized coefficients in the current region.

In some embodiments, the processing unit 22 is further configured to: adjust the P quantized coefficients such that the parity corresponding to the P quantized coefficients is consistent with the parity of the second quantized coefficient, in response to the parity corresponding to the P quantized coefficients being inconsistent with the parity of the second quantized coefficient.

In some embodiments, the processing unit 22 is further configured to: in response to the parity of the second quantized coefficient being indicated by a parity of a sum of first absolute values of the P quantized coefficients, the first absolute values are part or all of absolute values of the P quantized coefficients, adjust values of the P quantized coefficients such that the parity of the sum of the first absolute values of the P quantized coefficients is consistent with the parity of the second quantized coefficient.

In some embodiments, the processing unit 22 is configured to: adjust the values of the P quantized coefficients such that a sum of first absolute values of the adjusted P quantized coefficients is an odd number, in response to the second quantized coefficient being an odd number and the sum of the first absolute values of the P quantized coefficients being an even number; and adjust the values of the P quantized coefficients such that a sum of first absolute values of the adjusted P quantized coefficients is an even number, in response to the second quantized coefficient being an even number and the sum of the first absolute values of the P quantized coefficients being an odd number.

In some embodiments, the processing unit 22 is configured to: in response to the parity of the second quantized coefficient being indicated by a parity of the number of target quantized coefficients among the P quantized coefficients, adjust values of the P quantized coefficients such that the parity of the number of the target quantized coefficients among the P quantized coefficients is consistent with the parity of the second quantized coefficient.

In some embodiments, the processing unit 22 is configured to: adjust the values of the P quantized coefficients such that the number of target quantized coefficients among the adjusted P quantized coefficients is an odd number, in response to the second quantized coefficient being an odd number and the number of the target quantized coefficients among the P quantized coefficients being an even number; and adjust the values of the P quantized coefficients such that the number of target quantized coefficients among the adjusted P quantized coefficients is an even number, in response to the second quantized coefficient being an even number and the number of the target quantized coefficients among the P quantized coefficients being an odd number.

In some embodiments, the target quantized coefficient is any one of the following among the P quantized coefficients: a non-zero quantized coefficient, a non-zero quantized coefficient having an even value, a quantized coefficient having an even value, or a quantized coefficient having an odd value.

In some embodiments, the processing unit 22 is configured to: make calculation on the second quantized coefficient with a preset calculation method according to the parity of the second quantized coefficient, to obtain the first quantized coefficient.

In some embodiments, the preset calculation method includes dividing a value of the second quantized coefficient by two and then rounding.

In some embodiments, the processing unit 22 is configured to: hide the parity of the second quantized coefficient to obtain the first quantized coefficient in response to the current region satisfying a preset condition.

In some embodiments, the preset condition includes at least one of: the number of non-zero quantized coefficients in the current region being greater than a first value; in the current region, a distance between a first non-zero quantized coefficient and a last non-zero quantized coefficient in a scan order being greater than a second value; in the current region, a distance between the first non-zero quantized coefficient and a last quantized coefficient in the scan order being greater than a third value; or in the current region, a sum of absolute values of the non-zero quantized coefficients being greater than a fourth value.

In some embodiments, at least one of the first value, the second value, the third value, or the fourth value is a fixed value.

In some embodiments, at least one of the first value, the second value, the third value, or the fourth value is a non-fixed value.

In some embodiments, the encoding unit 23 is further configured to: when at least one of the first value, the second value, the third value, or the fourth value is a non-fixed value, signal the non-fixed value in the bitstream.

In some embodiments, the first quantized coefficient is a non-zero quantized coefficient at the K-th position in a scan order in the current region, and the K is less than or equal to the number of non-zero quantized coefficients in the current region.

In some embodiments, the processing unit 22 is configured to: partition the current block into the N regions according to a scan order.

In some embodiments, the processing unit 22 is configured to: partition the current block into the N regions according to a spatial position.

In some embodiments, at least two of the N regions include the same number of quantized coefficients.

In some embodiments, at least two of the N regions include different numbers of quantized coefficients.

In some embodiments, the processing unit 22 is further configured to: obtain at least one flag, where the at least one flag indicates whether a parity of a quantized coefficient is allowed to be hidden; and partition the current block into the N regions, in response to determining according to the at least one flag that the parity of the quantized coefficient in the current block is allowed to be hidden.

In some embodiments, the at least one flag includes at least one of: a sequence-level flag, a picture-level flag, a slice-level flag, a unit-level flag, or a block-level flag.

In some embodiments, the processing unit 22 is further configured to: skip partitioning the current block into the N regions in response to the current block being transformed in a target transform mode.

In some embodiments, the target transform mode includes a secondary transform or multiple transforms.

In some embodiments, the partitioning unit 21 is configured to partition the current block into one region.

In some embodiments, the second quantized coefficient is a last quantized coefficient in a scan order in the current block.

In some embodiments, the partitioning unit 21 is configured to partition the current block into one region in response to the current block satisfying a given condition.

In some embodiments, the given condition includes at least one of: the number of non-zero quantized coefficients in the current block being greater than a first value; a current sequence containing the current block allowing a parity of a quantized coefficient to be hidden; a transform mode used for the current block being a non-transform skip mode in both horizontal and vertical directions; or the current block being a luma block.

It should be understood that, the device embodiments and the method embodiments may correspond to each other, and for similar elaborations, reference can be made to the method embodiments, which will not be described again herein to avoid redundancy. Specifically, the video encoding device 20 illustrated in FIG. 13 may correspond to a corresponding entity for performing the method according to the embodiment of the disclosure, and the foregoing and other operations and/or functions of various units in the video encoding device 20 are respectively intended to implement corresponding processes of various methods, which will not be repeated herein for brevity.

The device and system of embodiments of the disclosure are described above from the perspective of functional units with reference to the accompanying drawings. It should be understood that, the functional unit may be implemented in the form of hardware, or may be implemented by an instruction in the form of software, or may be implemented by a combination of hardware and software unit. Specifically, each step of the method embodiments of the disclosure may be completed by an integrated logic circuit of hardware in a processor and/or an instruction in the form of software. The steps of the method disclosed in embodiments of the disclosure may be directly implemented by a hardware decoding processor, or may be performed by hardware and software units in the decoding processor. Optionally, the software unit may be located in a storage medium such as a random access memory (RAM), a flash memory, a read only memory (ROM), a programmable ROM (PROM), or an electrically erasable programmable memory, registers, and the like. The storage medium is located in a memory. The processor reads the information in the memory, and completes the steps of the foregoing method embodiments with the hardware of the processor.

Figure 14:
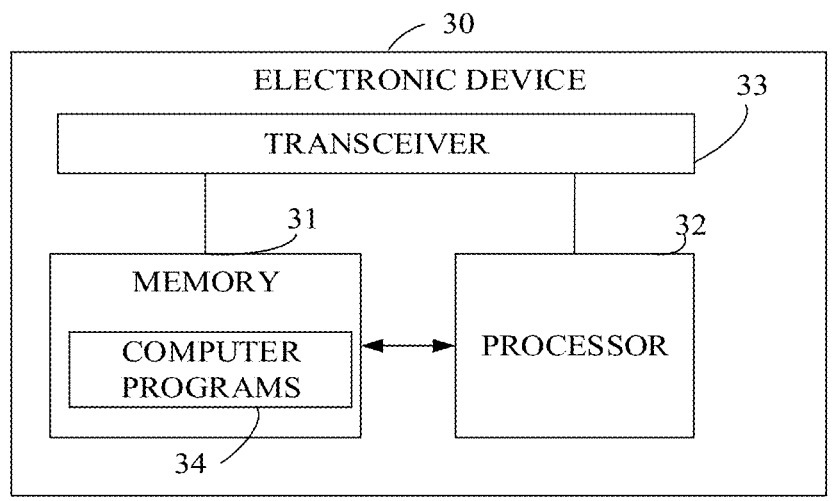
FIG. 14 is a schematic block diagram of an electronic device provided in embodiments of the disclosure.

FIG. 14 is a schematic block diagram of an electronic device provided in embodiments of the disclosure.

As illustrated in FIG. 14, the electronic device 30 may be a video encoder or a video decoder according to embodiments of the disclosure. The electronic device 30 may include a memory 31 and a processor 32. The memory 31 is configured to store computer programs 34 and transmit the computer programs 34 to the processor 32. In other words, the processor 32 may call the computer programs 34 from the memory 31 to implement the method in embodiments of the disclosure.

For example, the processor 32 may be configured to perform the steps in the method described above according to instructions in the computer programs 34.

In some embodiments of the disclosure, the processor 32 may include, but is not limited to: a general-purpose processor, a digital signal processor (DSP), an application specific integrated circuit (ASIC), a field programmable gate array (FPGA), or other programmable logic devices, discrete gates or transistor logic devices, discrete hardware components, etc.

In some embodiments of the disclosure, the memory 31 includes, but is not limited to: a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

In some embodiments of the disclosure, the computer program 34 may be partitioned into one or more units, and the one or more units are stored in the memory 31 and executed by the processor 32 to complete the method provided in the disclosure. The one or more units may be a series of computer program instruction segments capable of performing particular functions, where the instruction segments are used for describing the execution of the computer program 34 in the electronic device 30.

As illustrated in FIG. 14, the electronic device 30 may further include a transceiver 33. The transceiver 33 may be connected to the processor 32 or the memory 31.

The processor 32 can control the transceiver 33 to communicate with other devices, and specifically, can send information or data to other devices, or receive information or data sent by other devices. The transceiver 33 may further include an antenna, where one or more antennas may be provided.

It should be understood that, various components in the electronic device 30 are connected via a bus system. In addition to a data bus, the bus system further includes a power bus, a control bus, and a status signal bus.

Figure 15:
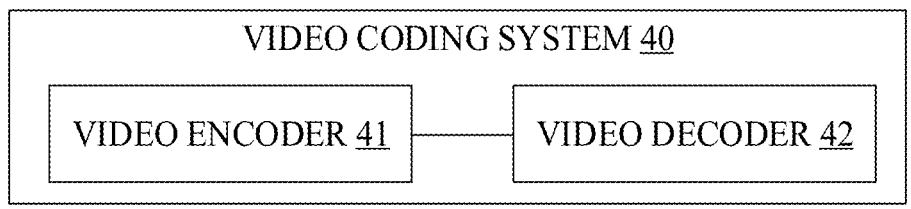
FIG. 15 is a schematic block diagram of a video coding system provided in embodiments of the disclosure.

FIG. 15 is a schematic block diagram of a video coding system provided in embodiments of the disclosure.

As illustrated in FIG. 15, the video coding system 40 may include a video encoder 41 and a video decoder 42. The video encoder 41 is configured to perform the video encoding method in embodiments of the disclosure, and the video decoder 42 is configured to perform the video decoding method in embodiments of the disclosure.

The disclosure further provides a computer storage medium. The computer storage medium is configured to store computer programs. The computer programs, when executed by a computer, are operable with the computer to perform the method in the foregoing method embodiments. Alternatively, embodiments of the disclosure further provide a computer program product. The computer program product includes instructions which, when executed by a computer, are operable with the computer to perform the method in the foregoing method embodiments.

The disclosure further provides a bitstream. The bitstream is generated according to the video encoding method.

When implemented by software, all or some the above embodiments can be implemented in the form of a computer program product. The computer program product includes one or more computer instructions. When the computer instructions are applied and executed on a computer, all or some the operations or functions of the embodiments of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disk, a hard disk, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, devices, and methods disclosed in embodiments of the disclosure may also be implemented in various other manners. For example, the above device embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise. Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure. For example, various functional units described in various embodiments of the disclosure may be integrated into one processing unit or may be present as a number of physically separated units, and two or more units may be integrated into one.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A video decoder, comprising:
   at least one processor; and
   a memory coupled to the at least one processor and storing at least one computer executable instruction thereon which, when executed by the at least one processor, causes the at least one processor to:
   decode a bitstream, to obtain P quantized coefficients and a first quantized coefficient in a current region, the current region being a region in a current block comprising at least one non-zero quantized coefficient, the first quantized coefficient being obtained by performing parity hiding on a second quantized coefficient in the current region, and P being a positive integer;
   determine a parity of the second quantized coefficient according to the P quantized coefficients; and
   determine the second quantized coefficient having the parity according to the first quantized coefficient and the parity of the second quantized coefficient.

2. The video decoder of claim 1, wherein the at least one processor configured to determine the parity of the second quantized coefficient according to the P quantized coefficients is configured to:
   determine the parity of the second quantized coefficient according to a parity corresponding to the P quantized coefficients.

3. The video decoder of claim 2, wherein the at least one processor configured to determine the parity of the second quantized coefficient according to the parity corresponding to the P quantized coefficients is configured to:
   determine the parity of the second quantized coefficient according to a parity of a sum of first absolute values of the P quantized coefficients, wherein the first absolute values are part or all of absolute values of the P quantized coefficients.

4. The video decoder of claim 3, wherein the at least one processor configured to determine the parity of the second quantized coefficient according to the parity of the sum of the first absolute values of the P quantized coefficients is configured to:
   determine that the second quantized coefficient is an odd number in response to the sum of the first absolute values of the P quantized coefficients being an odd number; and
   determine that the second quantized coefficient is an even number in response to the sum of the first absolute values of the P quantized coefficients being an even number.

5. The video decoder of claim 2, wherein the at least one processor configured to determine the parity of the second quantized coefficient according to the parity corresponding to the P quantized coefficients is configured to:
   determine target quantized coefficients among the P quantized coefficients; and
   determine the parity of the second quantized coefficient according to a parity of a number of the target quantized coefficients among the P quantized coefficients.

6. The video decoder of claim 5, wherein the at least one processor configured to determine the parity of the second quantized coefficient according to the parity of the number of the target quantized coefficients among the P quantized coefficients is configured to:
   determine that the second quantized coefficient is an odd number in response to the number of the target quantized coefficients among the P quantized coefficients being an odd number; and
   determine that the second quantized coefficient is an even number in response to the number of the target quantized coefficients among the P quantized coefficients being an even number.

7. The video decoder of claim 5, wherein the target quantized coefficient is any one of the following among the P quantized coefficients: a non-zero quantized coefficient, a non-zero quantized coefficient having an even value, a quantized coefficient having an even value, or a quantized coefficient having an odd value.

8. The video decoder of claim 1, wherein the at least one processor configured to determine the second quantized coefficient having the parity according to the first quantized coefficient and the parity of the second quantized coefficient is configured to:
make calculation on the first quantized coefficient with a preset calculation method, to obtain a calculation result; and
obtain the second quantized coefficient according to the parity of the second quantized coefficient and the calculation result.

9. The video decoder of claim 8, wherein the preset calculation method comprises multiplying a value of the first quantized coefficient by two.

10. The video decoder of claim 9, wherein the at least one processor configured to obtain the second quantized coefficient according to the parity of the second quantized coefficient and the calculation result is configured to:
determine a sum of the calculation result and a preset value to be the second quantized coefficient, wherein the preset value is 1 in response to the second quantized coefficient being an odd number and the preset value is 0 in response to the second quantized coefficient being an even number.

11. The video decoder of claim 1, wherein the at least one processor configured to determine the parity of the second quantized coefficient according to the P quantized coefficients is configured to:
determine the parity of the second quantized coefficient according to the P quantized coefficients in response to the current region satisfying a preset condition.

12. The video decoder of claim 11, wherein the preset condition comprises at least one of:
a number of non-zero quantized coefficients in the current region being greater than a first value;
in the current region, a distance between a first non-zero quantized coefficient and a last non-zero quantized coefficient in a decoding scan order being greater than a second value;
in the current region, a distance between the first non-zero quantized coefficient and a last quantized coefficient in the decoding scan order being greater than a third value; or
in the current region, a sum of absolute values of the non-zero quantized coefficients being greater than a fourth value.

13. The video decoder of claim 12, wherein at least one of the first value, the second value, the third value, or the fourth value is a fixed value.

14. The video decoder of claim 12, wherein at least one of the first value, the second value, the third value, or the fourth value is a non-fixed value.

15. The video decoder of claim 14, wherein when at least one of the first value, the second value, the third value, or the fourth value is a non-fixed value, the at least one processor is further configured to:
decode the bitstream to obtain the non-fixed value.

16. The video decoder of claim 1, wherein the at least one processor is further configured to:
skip determining the parity of the second quantized coefficient according to the P quantized coefficients, in response to the current block being transformed in a target transform mode.

17. The video decoder of claim 1, wherein the first quantized coefficient is a non-zero quantized coefficient at a K-th position in a scan order in the current region, and the K is less than or equal to a number of non-zero quantized coefficients in the current region.

18. The video decoder of claim 1, wherein the at least one processor configured to decode the bitstream, to obtain the P quantized coefficients and the first quantized coefficient in the current region is configured to:
decode the bitstream to obtain decoded information of the current block;
partition the current block into N regions, wherein N is a positive integer; and
obtain the P quantized coefficients and the first quantized coefficient from the decoded information of the current block.

19. A video encoder, comprising:
at least one processor; and
a memory coupled to the at least one processor and storing at least one computer executable instruction thereon which, when executed by the at least one processor, causes the at least one processor to:
partition a current block into N regions, N being a positive integer;
determine a second quantized coefficient in a current region and hide a parity of the second quantized coefficient to obtain a first quantized coefficient, the current region being a region among the N regions comprising at least one non-zero quantized coefficient; and
encode the first quantized coefficient to obtain a bitstream, the parity of the second quantized coefficient being indicated by P quantized coefficients in the current region and P being a positive integer.

20. A non-transitory computer readable medium storing a bitstream, wherein the bitstream is obtained according to a method, comprising:
partitioning a current block into N regions, N being a positive integer;
determining a second quantized coefficient in a current region, the current region being a region among the N regions comprising at least one non-zero quantized coefficient;
hiding a parity of the second quantized coefficient to obtain a first quantized coefficient; and
encoding the first quantized coefficient to obtain the bitstream, the parity of the second quantized coefficient being indicated by P quantized coefficients in the current region and P being a positive integer.

* * * * *